United States Patent [19]
Sasaki et al.
[11] 4,242,260
[45] Dec. 30, 1980

[54] 2-HYDROXY-3-CARBONYLANILINONAPHTH-1-YL DISAZO DERIVATIVES AND 1-PHENYL-3-METHYL-5-HYDROXYPYRAZOL-4-YL DISAZO DERIVATIVES OF 1,4-BIS(4-AMINOSTYRYL) BENZENE

[75] Inventors: Masaomi Sasaki, Kawasaki; Kiyoshi Sakai, Tokyo; Mitsuru Hashimoto, Hino; Masafumi Ohta; Akio Kozima, both of Yokohama, all of Japan

[73] Assignee: Ricoh Company, Ltd., Tokyo, Japan

[21] Appl. No.: 961,963

[22] Filed: Nov. 20, 1978

Related U.S. Application Data

[62] Division of Ser. No. 898,130, Apr. 20, 1978.

[30] Foreign Application Priority Data

Apr. 27, 1977 [JP] Japan ................................ 52-48859
Apr. 27, 1977 [JP] Japan ................................ 52-48860

[51] Int. Cl.[3] ..................... C07C 107/04; C09B 35/24; G03C 5/54; G03C 1/76

[52] U.S. Cl. .................................... 260/160; 260/141; 260/152; 260/164; 260/188; 430/72; 430/73; 430/76

[58] Field of Search ........................ 260/160, 188, 578

[56] References Cited

U.S. PATENT DOCUMENTS

| | | | |
|---|---|---|---|
| 3,299,040 | 1/1967 | Jeremias et al. | 260/160 |
| 3,313,799 | 4/1967 | Noll | 260/160 |
| 3,577,403 | 5/1971 | Raab et al. | 260/160 |
| 3,778,270 | 12/1973 | Roos | 260/141 X |
| 3,971,741 | 7/1976 | Dehmel et al. | 260/173 |

OTHER PUBLICATIONS

Campbell et al., J. Org. Chem., vol. 24, pp. 1246 to 1251 (1959).

Scarlata et al., Chemical Abstracts, vol. 85, #95624y (1976).

*Primary Examiner*—Floyd D. Higel
*Attorney, Agent, or Firm*—Blanchard, Flynn, Thiel, Boutell & Tanis

[57] ABSTRACT

The present invention provides disazo compounds expressed by the general formula I

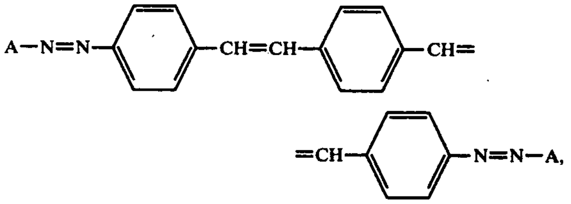

wherein A represents

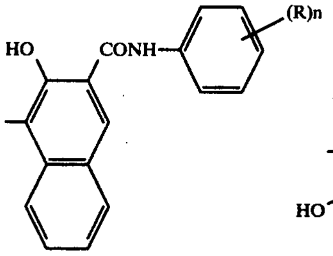

or

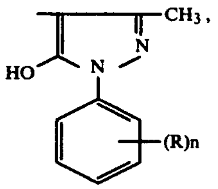

in which R represents alkyl radical, alkoxy radical, nitro radical, dialkylamino radical or halogen, n is 0 or an integer of 1, 2 or 3, and R may be either identical or different when n is an integer of 2 or 3. The disazo compounds are useful as photoconductive substances or charge-carrier generating substances in various kinds of electrophotographic elements.

28 Claims, 11 Drawing Figures

2-HYDROXY-3-CARBONYLANILINONAPHTH-1-YL DISAZO DERIVATIVES AND 1-PHENYL-3-METHYL-5-HYDROXYPYRAZOL-4-YL DISAZO DERIVATIVES OF 1,4-BIS(4-AMINOSTYRYL) BENZENE

This is a division of application Ser. No. 898,130, filed Apr. 20, 1978.

BACKGROUND OF THE INVENTION (a) Field of the Invention

The present invention relates to novel disazo compounds, a process for the preparation of the same, and application of said disazo compounds and analogues thereof to electrophotographic sensitive materials.

(b) Description of the Prior Art

It is known that some organic compounds, for instance, indigo-type compounds, phthalocyanine-type compounds, etc., are useful as a photoconductive material for preparing photosensitive materials for use in the electrophotographic process. The "electrophotographic process" herein is one of the image-forming processes which generally comprise first charging a photoconductive sensitive material with electricity by corona discharge or the like in the dark, subsequently subjecting it to image-wise exposure so as to discharge the electric charge of the exposed area selectively, thereby obtaining an electrostatic latent image, and then rendering visible this latent image area by a developing means employing a toner, etc., thereby forming an intended image. As the fundamental characteristics required for the photosensitive materials for use in the electrophotographic process, there are enumerated (1) an appropriate chargeability in the dark, (2) a low dischargeability in the dark, and (3) a rapid dischargeability with exposure to light. As a matter of fact, however, the known organic photoconductive compounds have not always sufficiently satisfied these requirements.

As applicable photoconductive materials, there are known inorganic materials such as selenium, zinc oxide, etc., of which selenium has admittedly been widely put to practical use. However, with the adoption of various electrophotographic processes, there is an increasing demand for, for instance, a belt-shaped photosensitive material or the like having the aforementioned fundamental characteristics as well as a satisfactory flexibility with respect to the shape thereof. In this regard, the foregoing selenium is generally difficult to form into a photosensitive material having such a shape as above.

Meanwhile, as the electrophotographic sensitive material prepared by forming a photosensitive layer containing some azo compound, as an effective ingredient, on a conductive support, such one as prepared by employing monoazo compound (cf. Japanese Patent Publication No. 16474/1969), one prepared by employing benzidine-type disazo compound (cf. U.S. Pat. No. 3,898,048, U.S. Pat. No. 4,052,210), etc. are well known. These azo compounds are admittedly useful materials as an effective ingredient of the photosensitive layer as stated above, but when various requirements for photosensitive materials are taken into account from the viewpoint of the electrophotographic process, there has in fact not yet been obtained such a material as will sufficiently meet these requirements. Therefore, it is a matter of more importance to provide a wide variety of compounds, not limiting to azo compounds, so as to afford a wide range of selection of compounds acting as an effective ingredient, thereby rendering it possible to provide a photosensitive material apposite to any specific process. In other words, it is desirable for the electrophotographic process that the variety of the compounds useful as an effective ingredient of photosensitive materials is as wide as possible.

SUMMARY OF THE INVENTION

A primary object of the present invention is to provide novel disazo compounds which are free from the drawbacks possessed by the photoconductive substances employed for the afore described photosensitive materials and are especially useful as a photoconductive material, as well as a process for the preparation of said compounds.

Another object of the present invention is to provide electrophotographic sensitive materials having a high sensitivity as well as a high flexibility which contain a novel disazo compound, said disazo compound being selectable from a great variety and useful as an effective ingredient in various electrophotographic processes.

BRIEF DESCRIPTION OF THE DRAWINGS

FIG. 2 is the infrared absorption spectrum of

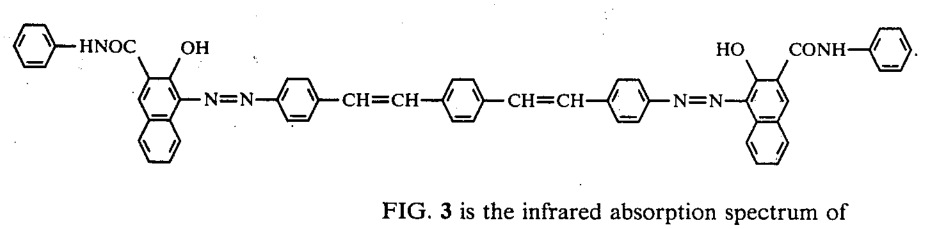

Figure 3:
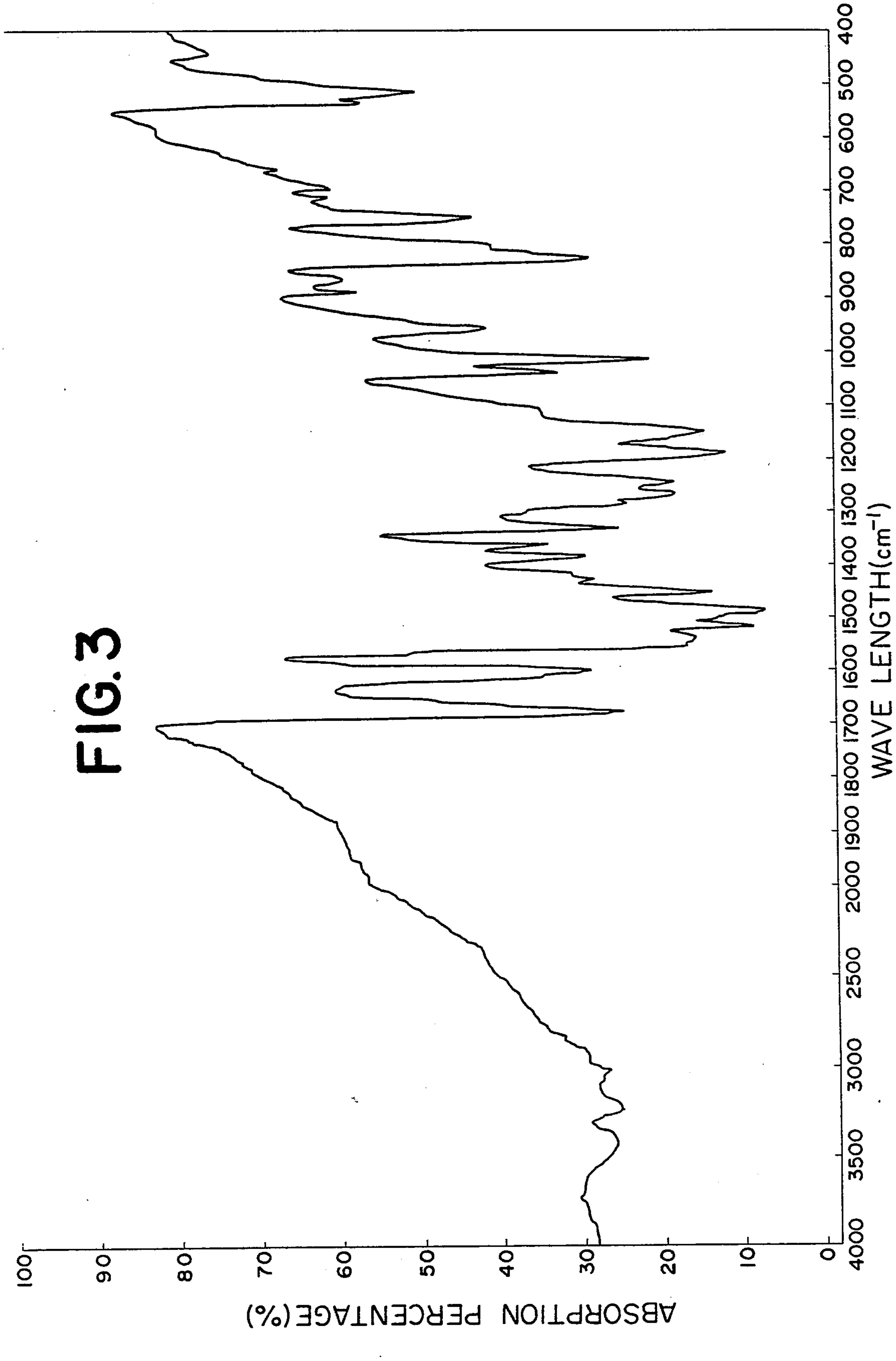

FIG. 3 is the infrared absorption spectrum of

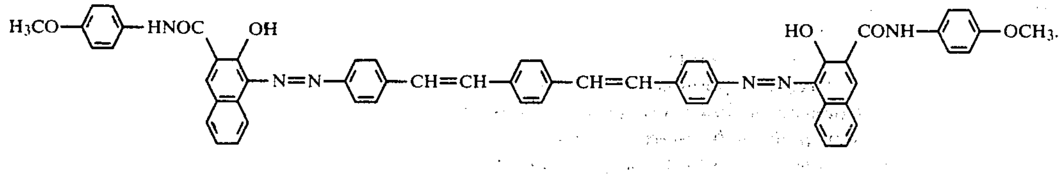

Figure 4:
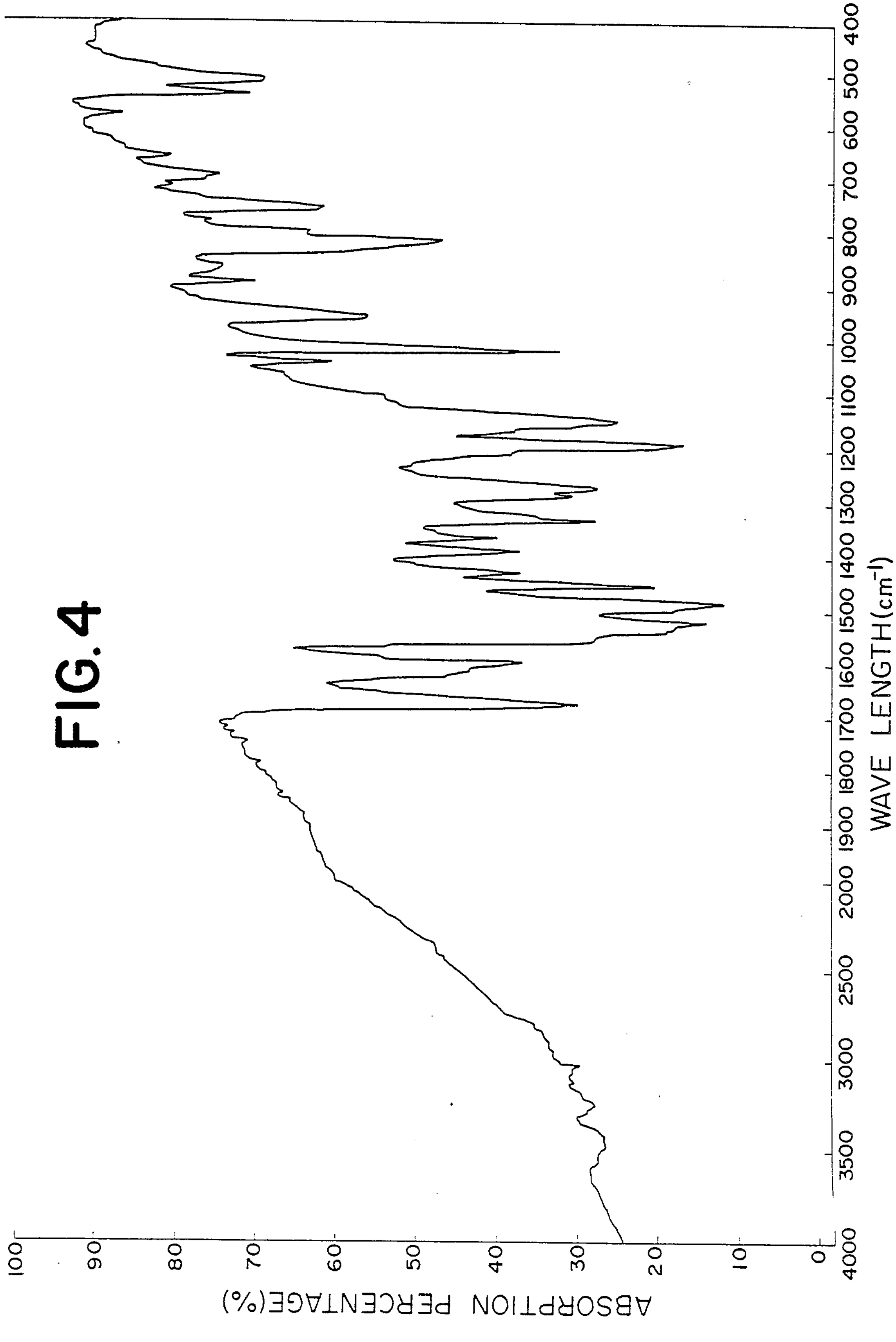

FIG. 4 is the infrared absorption spectrum of

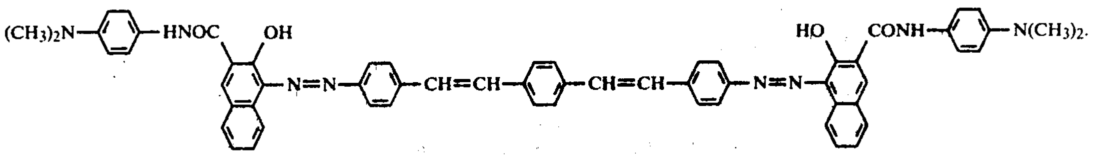

Figure 5:
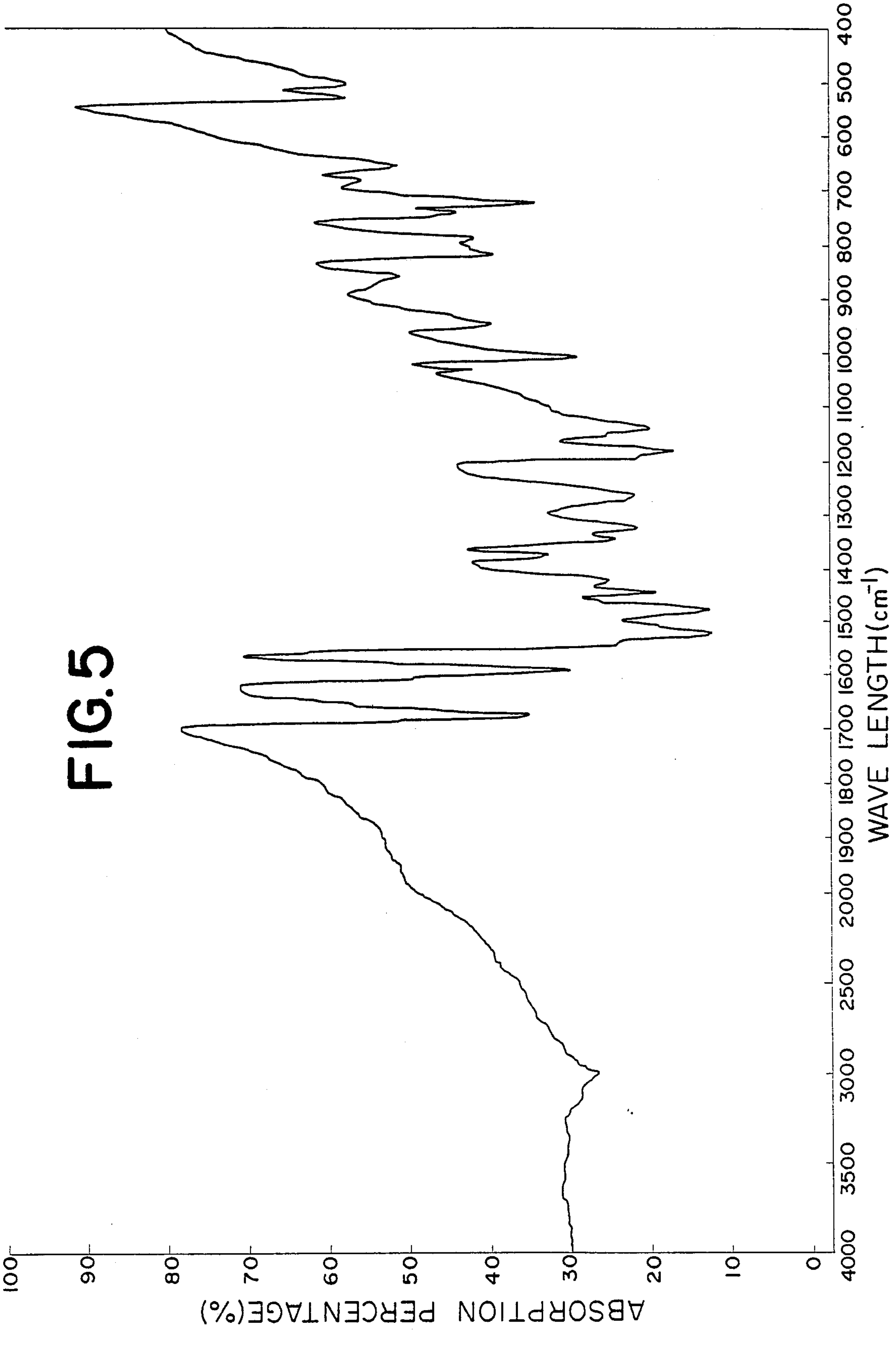

FIG. 5 is the infrared absorption spectrum of

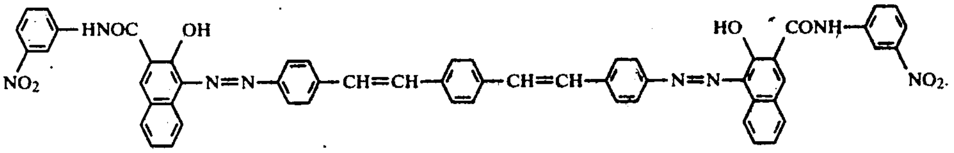

Figure 6:
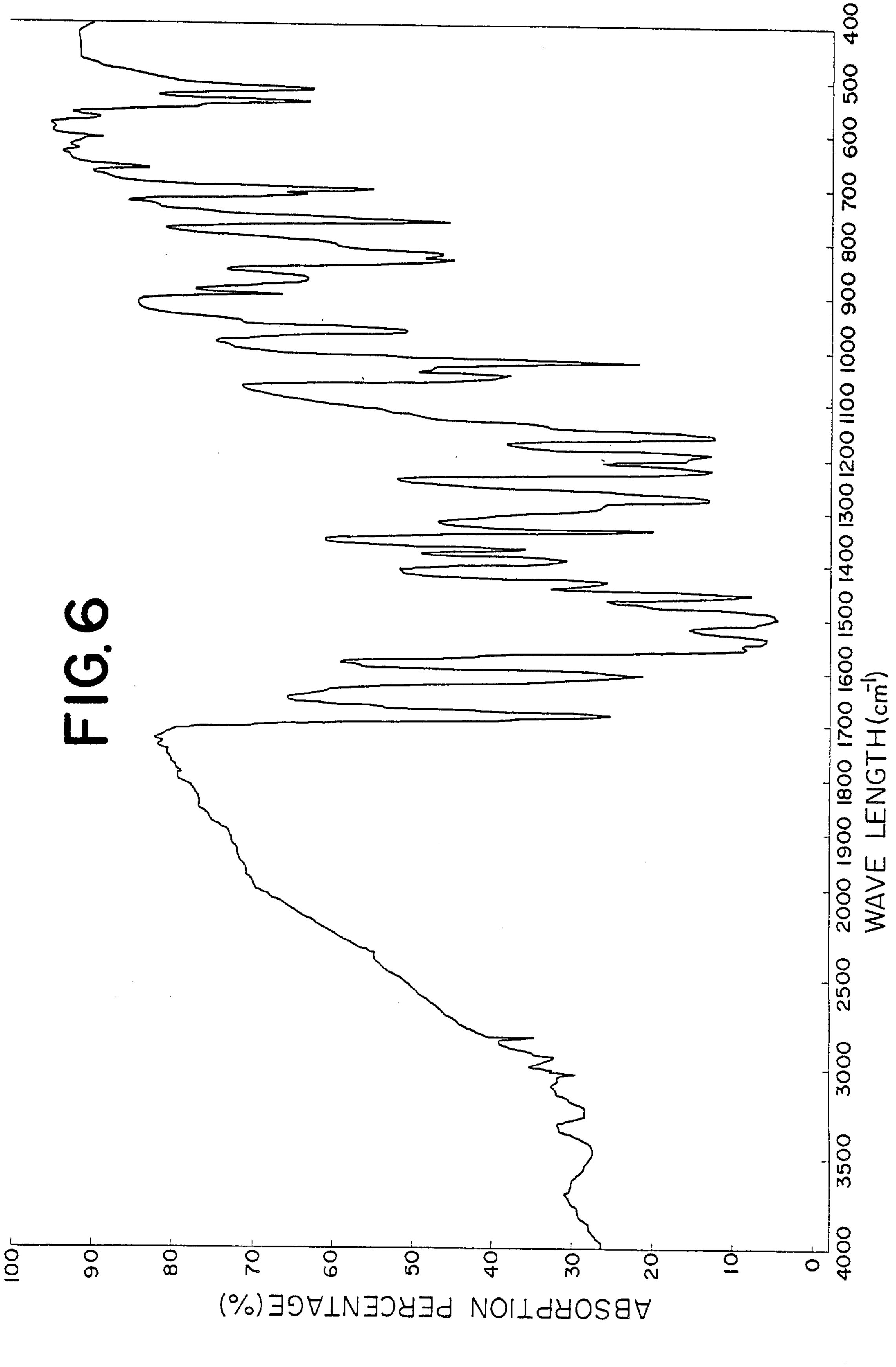

FIG. 6 is the infrared absorption spectrum of

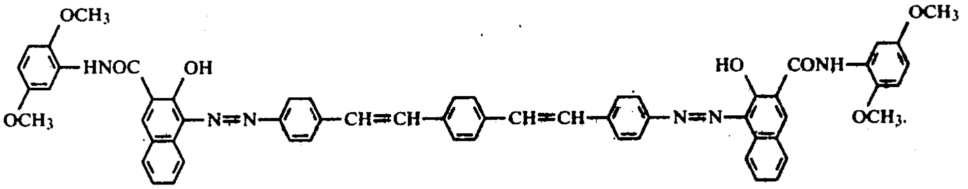

Figure 7:
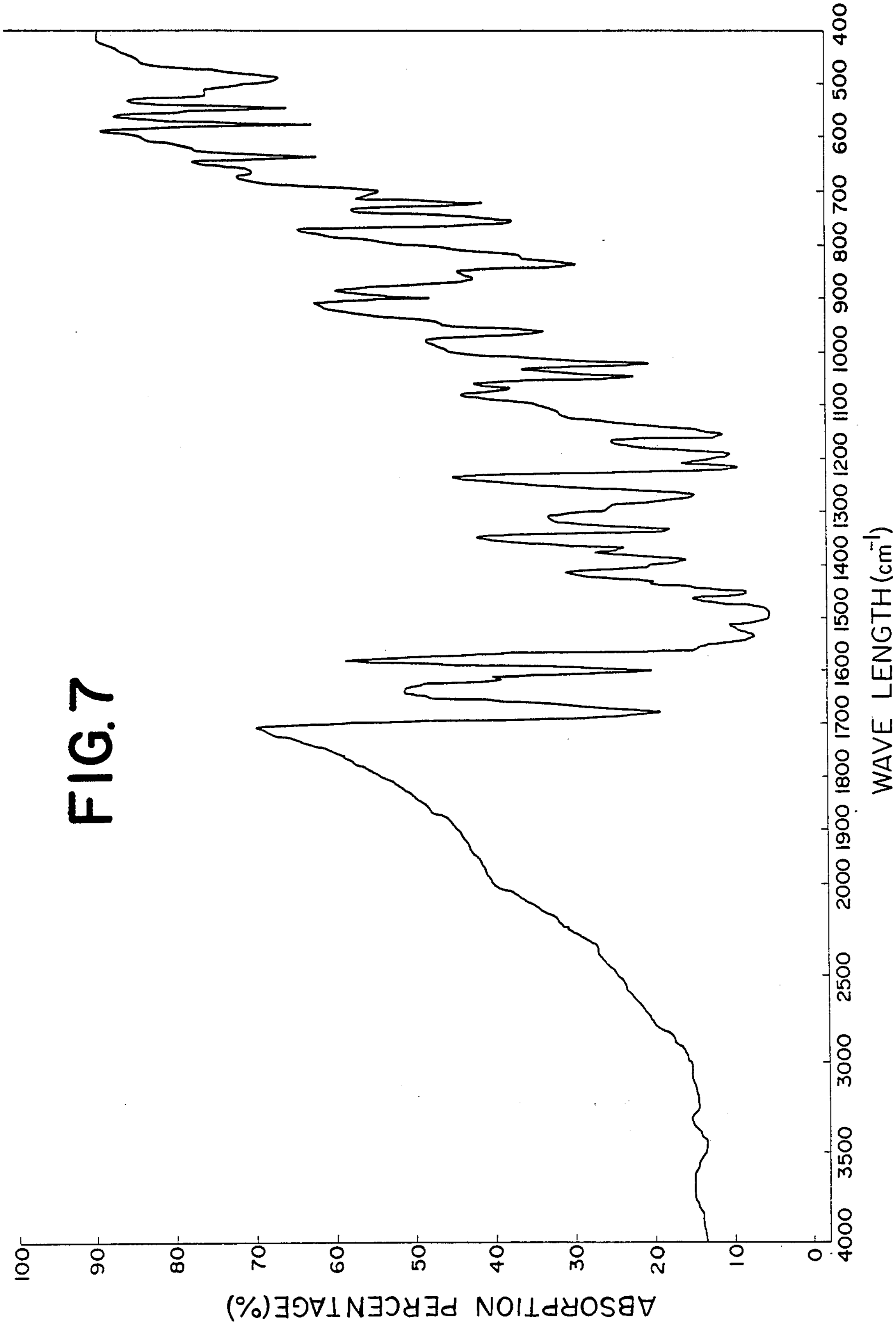

FIG. 7 is the infrared absorption spectrum of

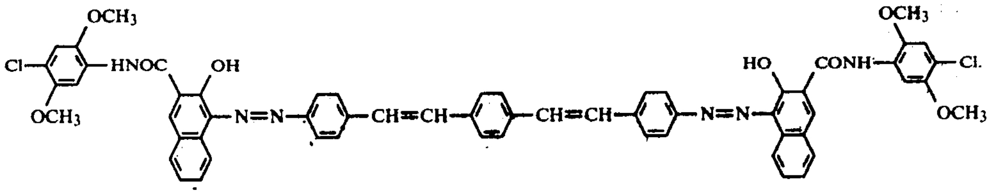

Figure 8:
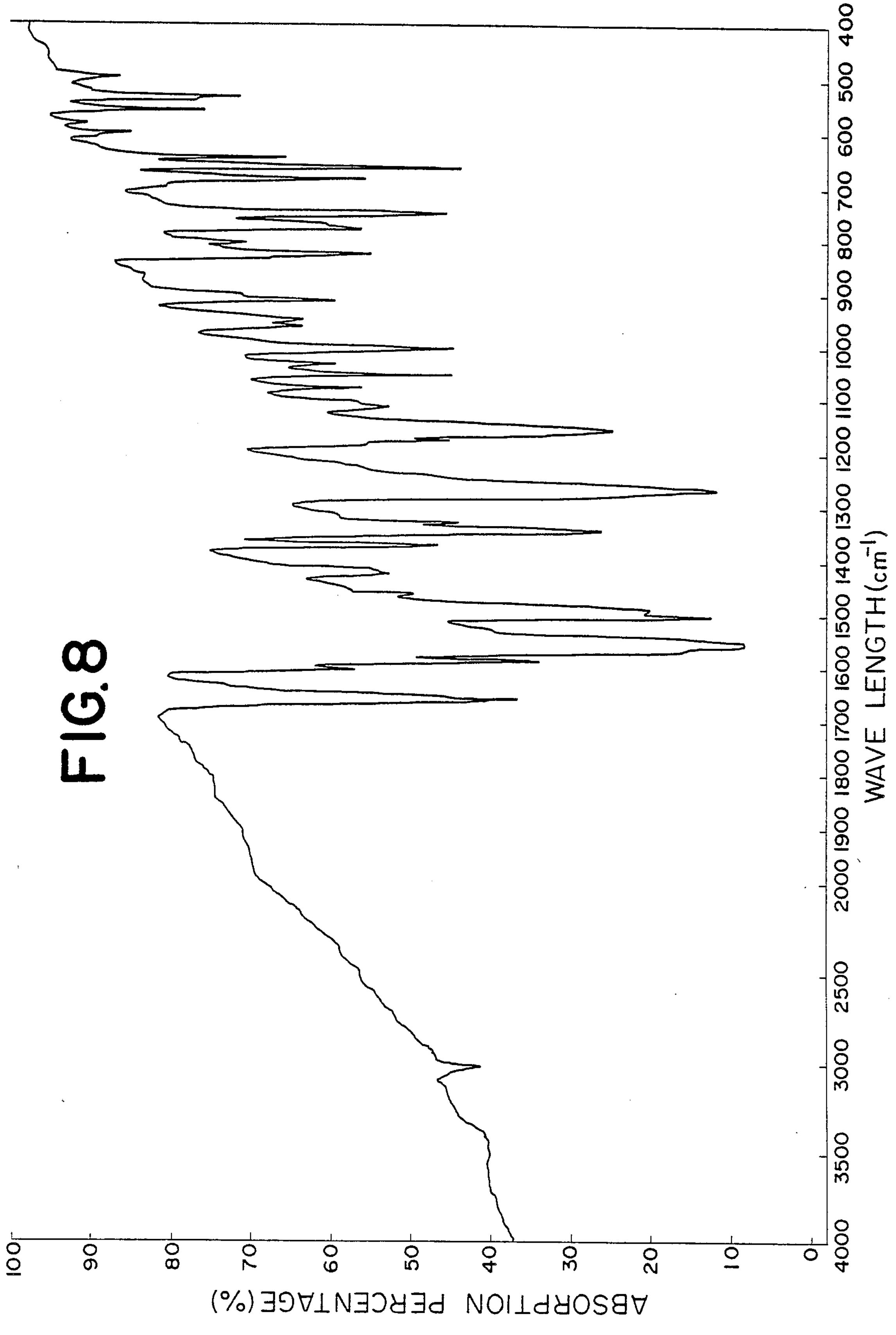

FIG. 8 is the infrared absorption spectrum of

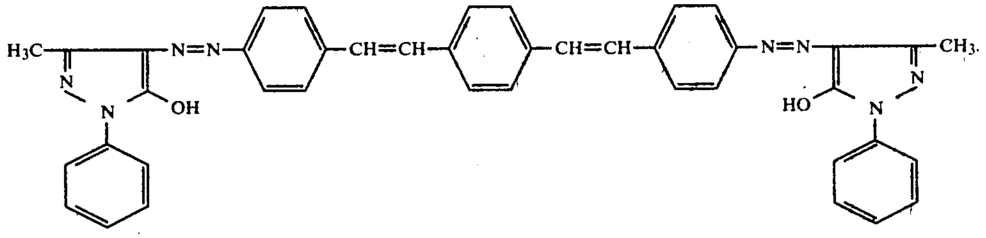

Figure 9:
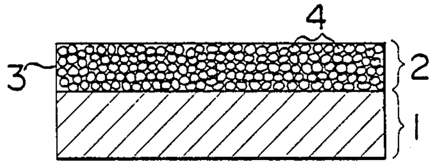
Figure 10:
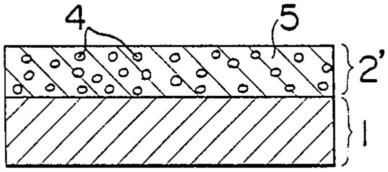
Figure 11:
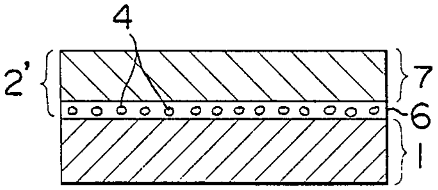

FIGS. 9 through 11 illustrate respectively enlarged crosssectional views of the photosensitive materials according to the present invention.

In the drawings, 1 denotes a conductive support, 2, 2' and 2" denote respectively a photosensitive layer, 3 denotes a binder, 4 denotes a disazo compound, 5 denotes a charge-transfer medium, 6 denotes a charge-carrier generating layer, and 7 denotes a charge-transfer medium layer.

In other words, one embodiment of the present invention is novel disazo compounds expressed by the general formula I

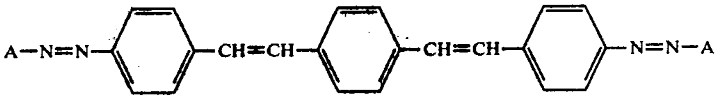

[wherein A represents

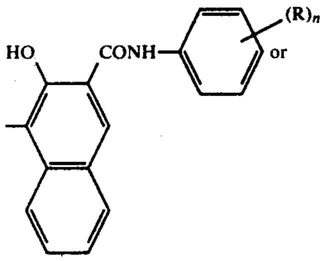
or
-continued
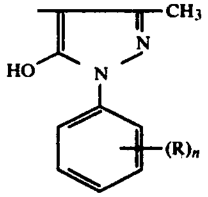
(wherein R represents alkyl radical, alkoxy radical, nitro radical, dialkylamino radical or halogen, n is 0 or an integer of 1, 2 or 3, and R may be either identical or different when n is an integer of 2 or 3)].
These novel disazo compounds are in the form of colored crystals at normal temperature, and concrete examples thereof are as shown in the following Table-1.

Table-1
| Compound No. | Structural formula of disazo compound (melting point) | | Elementary analysis value (%) actual value | theoretical value | Infrared absorption spectrum ($cm^{-1}$) $\nu C=O$ | $\delta t$-(CH=CH) | Color tone |
|---|---|---|---|---|---|---|---|
| | 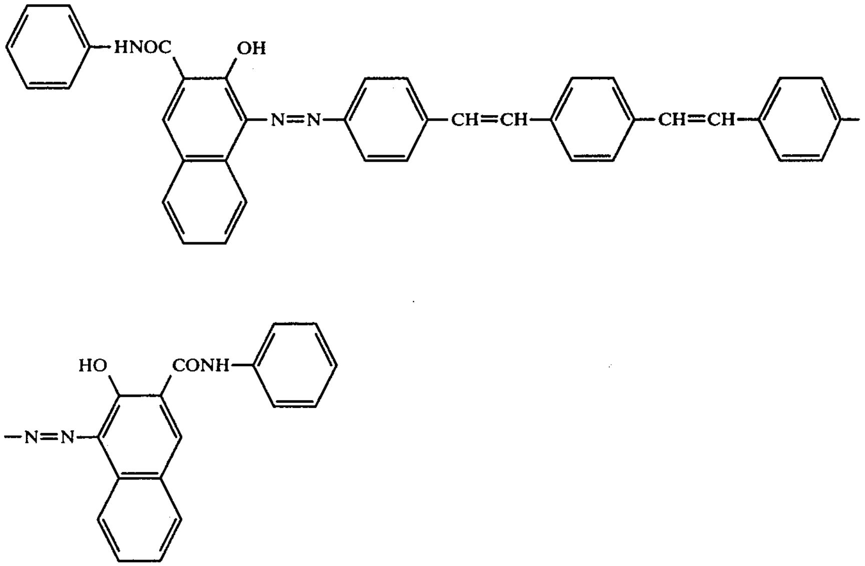 | C | 78.15 | 78.11 | | | |
| I | | H | 4.72 | 4.69 | 1685 | 960 | bluish black |
| | | N | 9.68 | 9.76 | | | |
| | (250° C. or more) | | | | | | |
| | 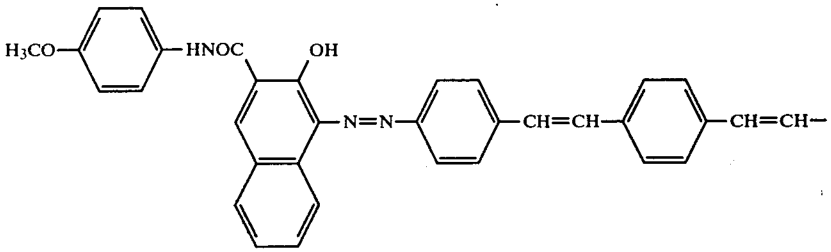 | C | 74.5 | 75.63 | | | |
| II | | H | 4.89 | 4.82 | 1670 | 960 | bluish black |

Table-1-continued
| Compound No. | Structural formula of disazo compound (melting point) | | Elementary analysis value (%) actual value | Elementary analysis value (%) theoretical value | Infrared absorption spectrum (cm$^{-1}$) νC=O | Infrared absorption spectrum (cm$^{-1}$) δt-(CH=CH) | Color tone |
|---|---|---|---|---|---|---|---|
| | 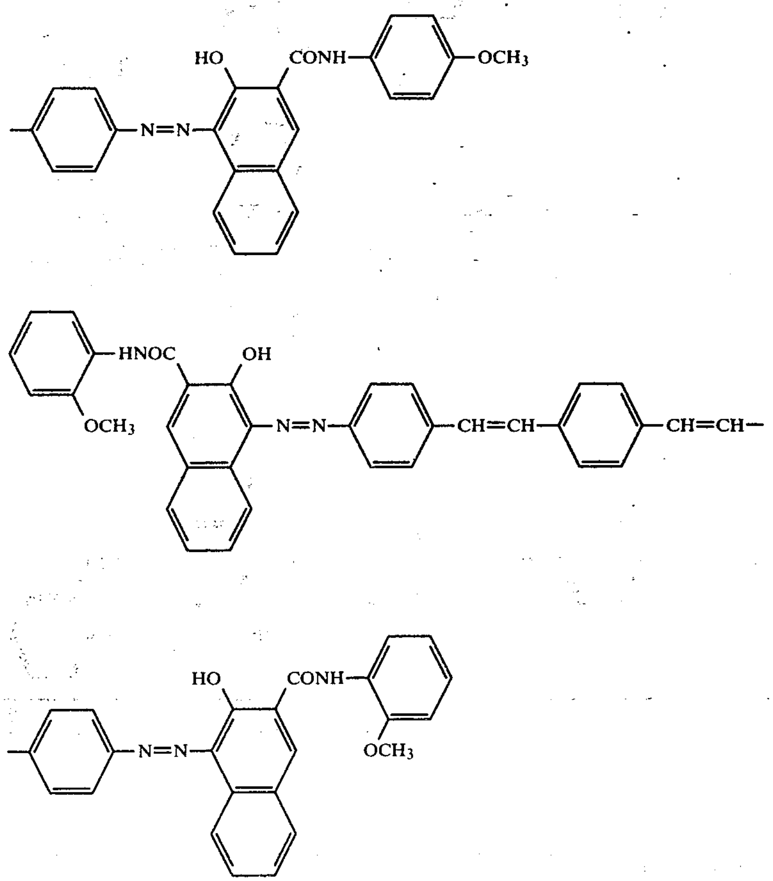 | N | 9.25 | 9.13 | | | |
| | (250° C. or more) | C | 75.30 | 75.63 | | | |
| III | | H | 4.90 | 4.82 | 1670 | 960 | bluish black |
| | | N | 9.15 | 9.13 | | | |
| | (250° C. or more) | | | | | | |

Table-1-continued
| Compound No. | Structural formula of disazo compound (melting point) | | Elementary analysis value (%) actual value | theoretical value | Infrared absorption spectrum ($cm^{-1}$) $\nu C{=}O$ | $\delta t$-(CH═CH) | Color tone |
|---|---|---|---|---|---|---|---|
| | 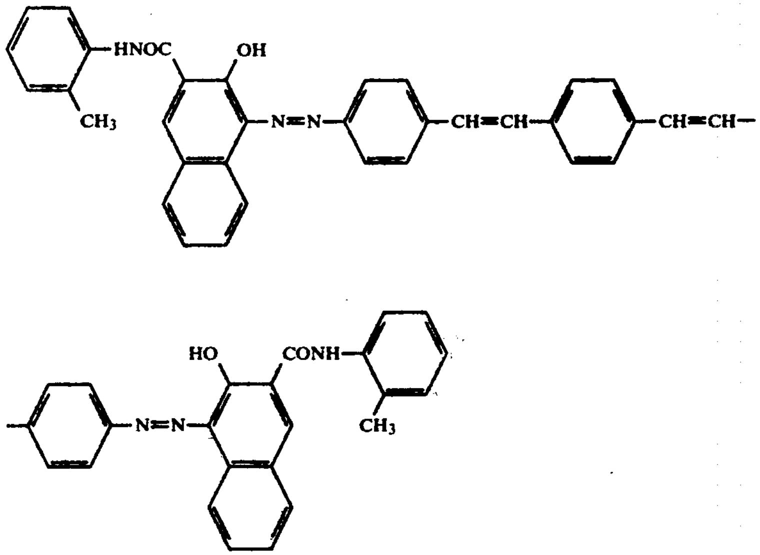 | C | 77.86 | 78.35 | | | |
| IV | | H | 5.07 | 5.00 | 1680 | 960 | bluish black |
| | | N | 9.30 | 9.45 | | | |
| | (250° C. or more) | | | | | | |
| | 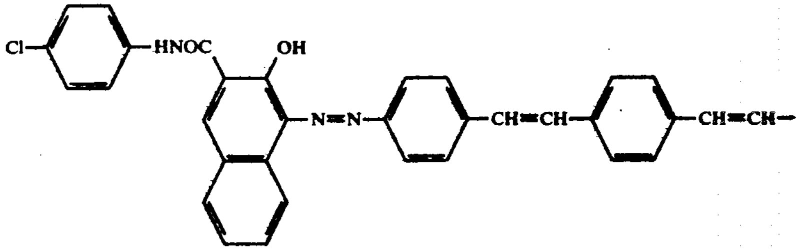 | C | 72.85 | 73.32 | | | |
| V | | H | 4.16 | 4.13 | 1680 | 960 | bluish black (with metallic luster) |

Table-1-continued
| Compound No. | Structural formula of disazo compound (melting point) | | Elementary analysis value (%) actual value | theoretical value | Infrared absorption spectrum ($cm^{-1}$) $\nu C=O$ | $\delta t$-(CH=CH) | Color tone |
|---|---|---|---|---|---|---|---|
| | 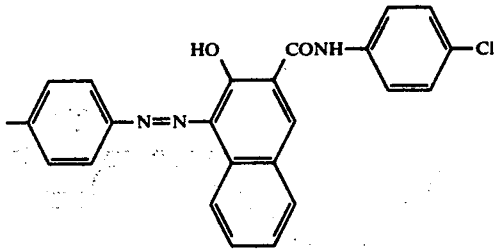 (250° C. or more) | N | 9.06 | 9.04 | | | |
| VI | 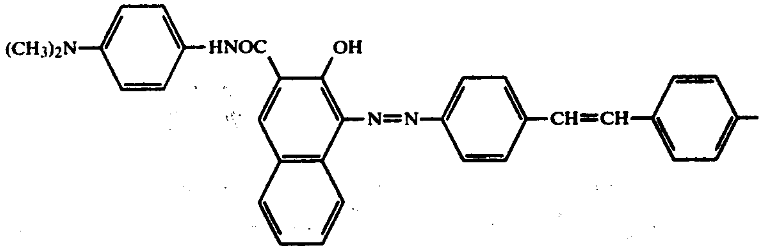 | C | 76.66 | 76.08 | | | |
| | | H | 5.28 | 5.33 | 1670 | 955 | bluish black |
| | 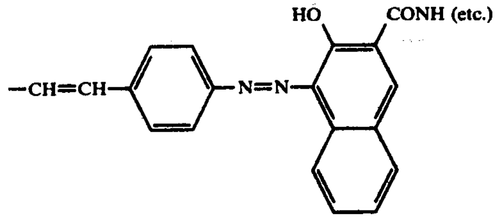 (250° C. or more) | N | 11.66 | 11.83 | | | |

Table-1-continued
| Compound No. | Structural formula of disazo compound (melting point) | | Elementary analysis value (%) actual value | Elementary analysis value (%) theoretical value | Infrared absorption spectrum ($cm^{-1}$) $\nu C=O$ | Infrared absorption spectrum ($cm^{-1}$) $\delta t$-(CH=CH) | Color tone |
|---|---|---|---|---|---|---|---|
| VII | 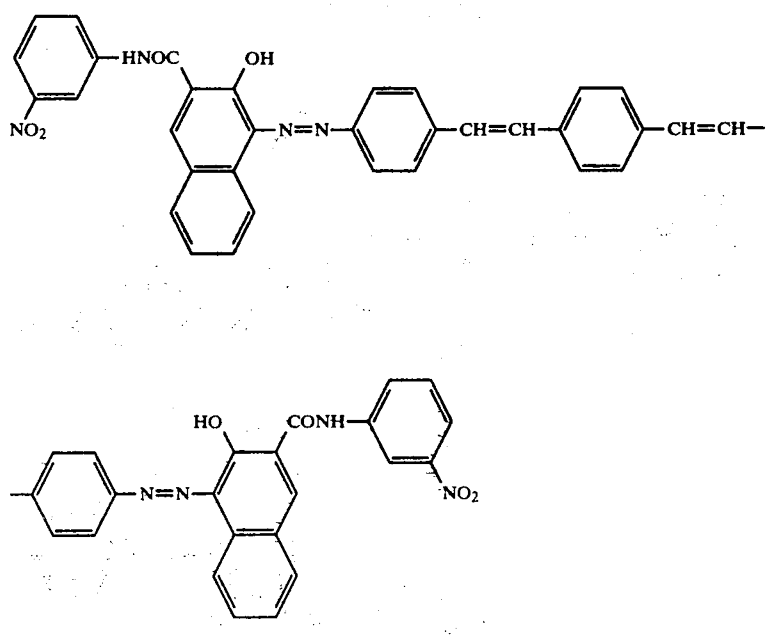 (250° C. or more) | C | 69.28 | 70.72 | | | |
| | | H | 3.85 | 4.04 | 1670 | 950 | bluish black (with metallic luster) |
| | | N | 11.70 | 11.79 | | | |
| | 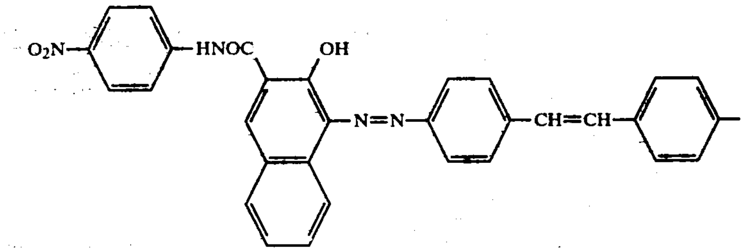 | C | 69.13 | 70.72 | | | bluish black (with |

Table-1-continued
| Compound No. | Structural formula of disazo compound (melting point) | | Elementary analysis value (%) actual value | theoretical value | Infrared absorption spectrum ($cm^{-1}$) $\nu C{=}O$ | $\delta t$-(CH=CH) | Color tone |
|---|---|---|---|---|---|---|---|
| VIII | 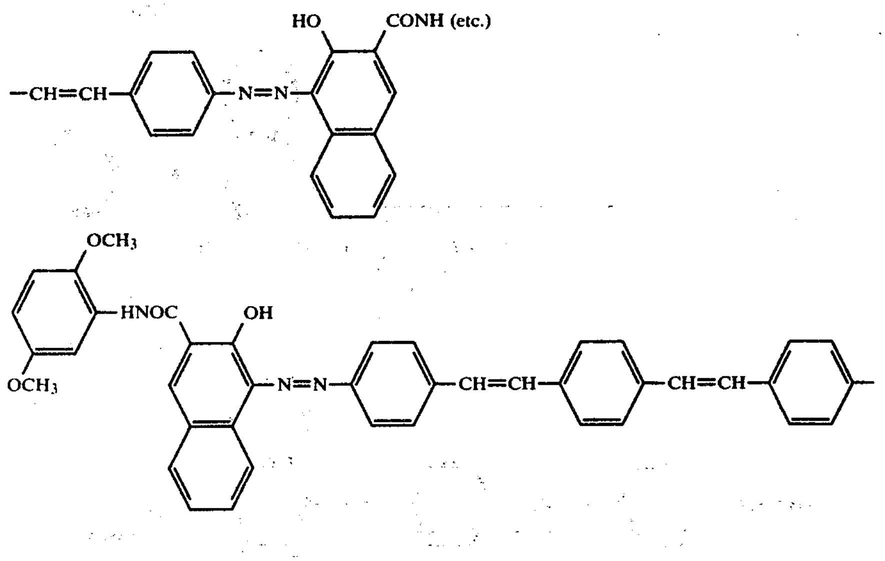 | H | 4.34 | 4.04 | 1680 | 960 | metallic luster) |
| | | N | 11.98 | 11.79 | | | |
| | | C | 72.85 | 73.45 | | | |
| IX | 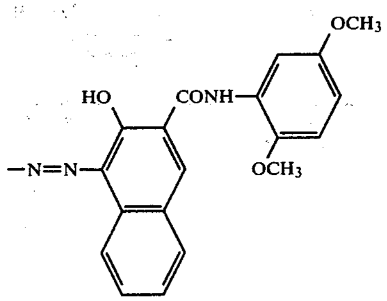 (250° C. or more) | H | 4.81 | 4.94 | 1680 | 960 | bluish black |
| | | N | 8.55 | 8.57 | | | |

Table-1-continued
| Compound No. | Structural formula of disazo compound (melting point) | | Elementary analysis value (%) actual value | theoretical value | Infrared absorption spectrum ($cm^{-1}$) $\nu C=O$ | $\delta t$-(CH=CH) | Color tone |
|---|---|---|---|---|---|---|---|
| X | 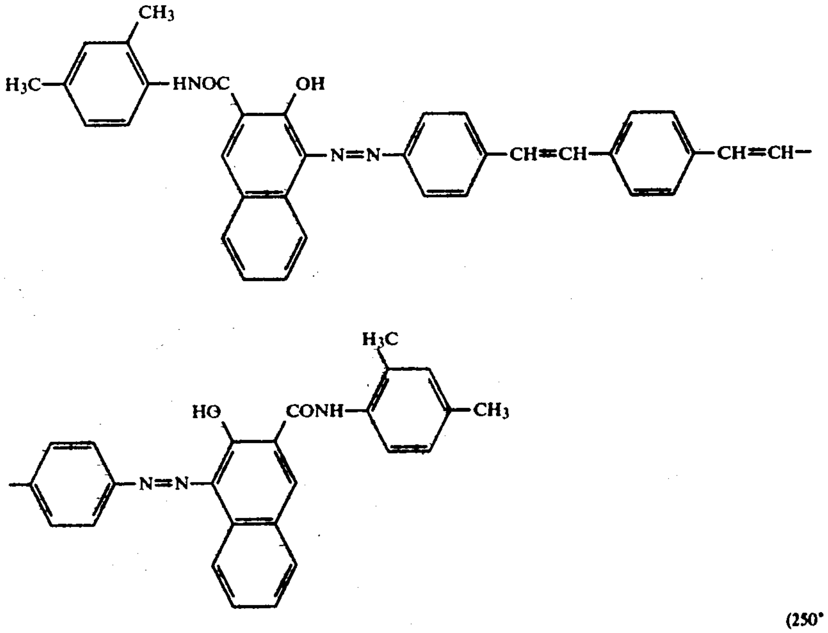 (250° C. or more) | C | 78.25 | 78.57 | | | |
| | | H | 5.31 | 5.29 | 1680 | 960 | bluish black |
| | | N | 9.02 | 9.17 | | | |
| | 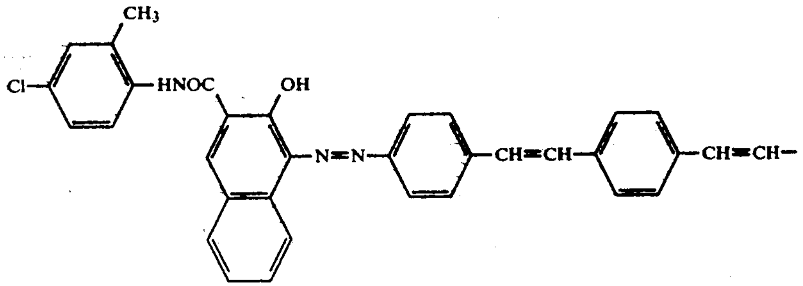 | C | 72.10 | 72.71 | | | bluish black |

Table-1-continued
| Compound No. | Structural formula of disazo compound (melting point) | | Elementary analysis value (%) actual value | theoretical value | Infrared absorption spectrum ($cm^{-1}$) $\nu C=O$ | $\delta t-(CH=CH)$ | Color tone |
|---|---|---|---|---|---|---|---|
| XI | | H | 4.39 | 4.43 | 1680 | 955 | (with metallic luster) |
| | 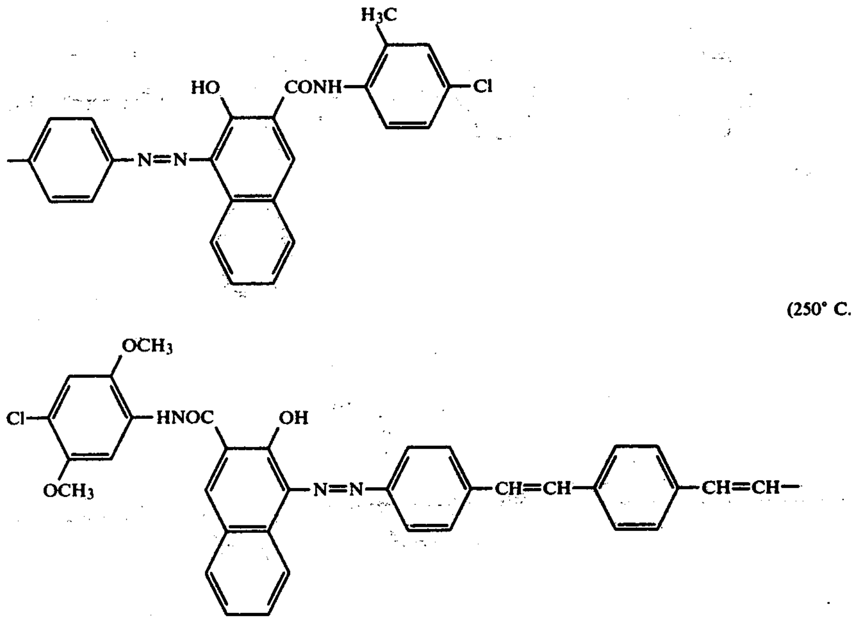 | N | 8.80 | 8.77 | | | |
| | (250° C. or more) | C | 67.20 | 68.62 | | | |
| XII | | H | 4.38 | 4.42 | 1680 | 960 | bluish black (with metallic luster) |

Table-1-continued
| Compound No. | Structural formula of disazo compound (melting point) | Elementary analysis value (%) | | | Infrared absorption spectrum ($cm^{-1}$) | | Color tone |
|---|---|---|---|---|---|---|---|
| | | | actual value | theoretical value | $\nu C=O$ | $\delta t$-(CH=CH) | |
| | 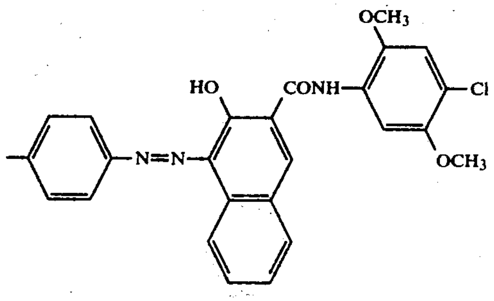 | N | 8.11 | 8.00 | | | |
| | (250° C. or more) | | | | | | |
| | 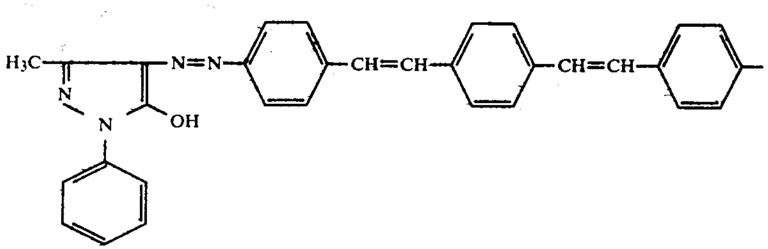 | C | 73.50 | 73.87 | | | |
| XIII | | H | 5.01 | 5.03 | — | 960 | red |
| | 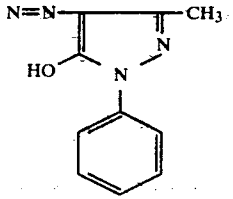 | N | 16.55 | 16.41 | | | |
| | (250° C. or more) | | | | | | |

Table-1-continued
| Compound No. | Structural formula of disazo compound (melting point) | | Elementary analysis value (%) actual value | theoretical value | Infrared absorption spectrum ($cm^{-1}$) $\nu C=O$ | $\delta t$-(CH=CH) | Color tone |
|---|---|---|---|---|---|---|---|
| XIV | 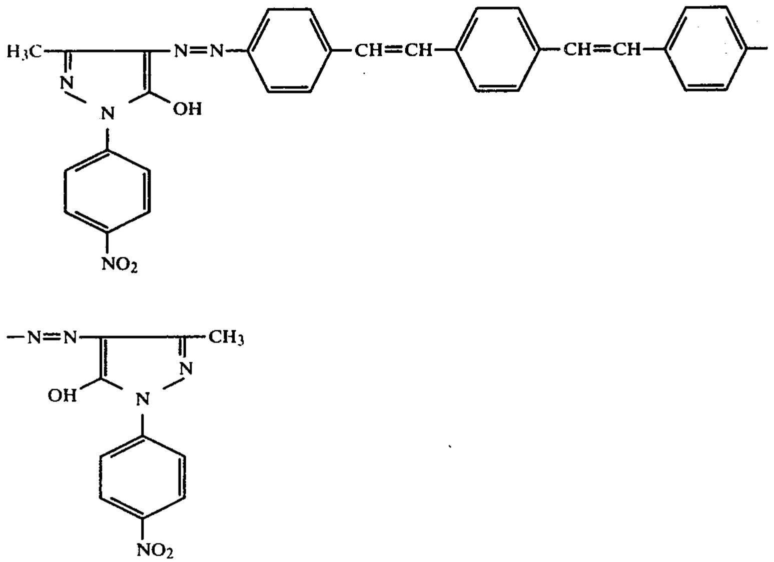 (250° C. or more) | C | 64.90 | 65.27 | | | |
| | | H | 4.20 | 4.18 | — | 955 | reddish brown |
| | | N | 17.98 | 18.13 | | | |

In this connection, the infrared absorption spectrum (according to KBr tablet process) of Compounds (I), (II), (VI), (VII), (IX), (XII) and (XIII) among these disazo compounds are as shown in FIGS. 2, 3, 4, 5, 6, 7 and 8, respectively.

These disazo compounds can be prepared by the process described below. That is to say, another embodiment of the present invention is a process of preparation of the foregoing novel disazo compounds, which process comprises diazotizing 1,4-bis(4-aminostyryl)-benzene expressed by the structural formula

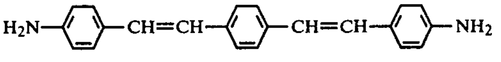

which is obtained by reducing, for instance, 1,4-bis(4-nitrostyryl)benzene into a tetrazonium salt expressed by the structural formula

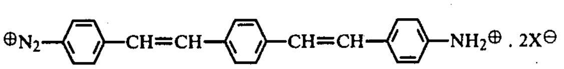

(wherein X represents anionic functional radical) and reacting this salt with a compound expressed by the following general formula

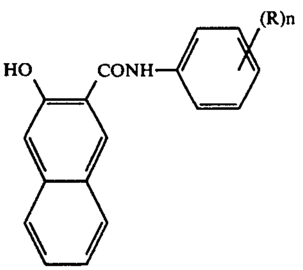

(a)

or

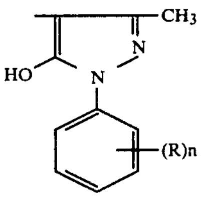

(b)

[in both (a) and (b) herein, R represents alkyl radical, alkoxy radical, nitro radical, dialkylamino radical or halogen, n is 0 or an integer of 1, 2 or 3, and R may be either identical or different when n is an integer of 2 or 3)].

1,4-bis(4-aminostyryl)benzene is a compound which can be obtained through reduction of 1,4-bis(4-nitrostyryl)benzene expressed by the structural formula

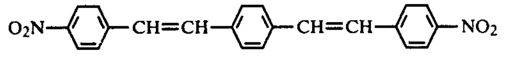

(which is obtained through the process proposed by W. Stilz et al). (cf. West Germany Pat. Publication No. 1,108,219) This reduction is performed by effecting reaction at a temperature of 80° to 110° C. for about 30 minutes to 2 hours within an organic solvent such as N,N-dimethyl formamide in the presence of a reducing agent such as iron-hydrochloric acid which is popular for use in reducing nitro radical.

Next, diazotization of the thus obtained 1,4-bis(4-aminostyryl)benzene is effected by adding an aqueous solution of sodium nitrite thereto within a dilute inorganic acid such as dilute hydrochloric acid or dilute sulfuric acid at a temperature of −10° C. to 10° C. This diazotization reaction completes in 30 minutes to 3 hours. Further, it is desirable to precipitate tetrazonium salt by adding borofluoric acid or the like to the reactant mixture and then filter said salt, thereby obtaining crystals. This tetrazonium salt is also a novel compound.

Subsequently, by adding the foregoing compound (a) or (b) (to wit, a coupler) to this tetrazonium salt, coupling reaction is effected between the tetrazonium salt and coupling agent. Practically speaking, this reaction is effected through the procedure comprising preparing a solution by mixing the tetrazonium salt and coupling ingredient with an organic solvent such as N,N-dimethyl formamide, etc. and adding to this solution dropwise an aqueous solution of alkali such as sodium acetate at a temperature of about −10° C. to 10° C. This reaction completes in 5 minutes to 3 hours.

Still another embodiment of the present invention is the application of the thus obtained disazo compounds as well as analogues thereof to electrophotographic sensitive materials. That is to say, the photosensitive material according to the present invention is an electrophotographic sensitive material which comprises a conductive support and a photosensitive layer formed thereon, said photosensitive layer containing a disazo compound, as an effective ingredient, which is expressed by the general formula II

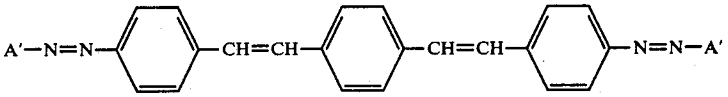

[wherein A' represents

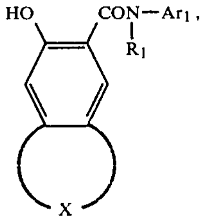

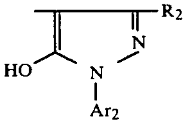

or

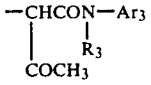

(wherein X represents aromatic rings such as benzene ring, naphthalene ring, etc., hetero rings such as indole ring, carbazole ring, benzofuran ring, etc. or their substituents, $Ar_1$ represents aromatic rings such as benzene ring, naphthalene ring, etc., hetero rings such as dibenzofuran, etc. or their substituents, $Ar_2$ and $Ar_3$ represent aromatic rings such as benzene ring, naphthalene ring, etc. or their substituents, $R_1$ and $R_3$ represent hydrogen, lower alkyl radical, phenyl radical or their substituents, and $R_2$ represent lower alkyl radical, carboxyl radical, or their esters)].

Shown hereunder in terms of structural formula are concrete examples of the compounds expressed by the foregoing general formula which are useful in the electrophotographic sensitive materials according to the present invention.

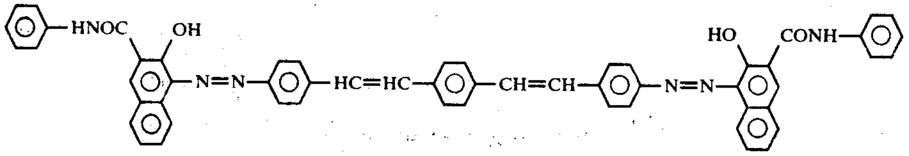
1.

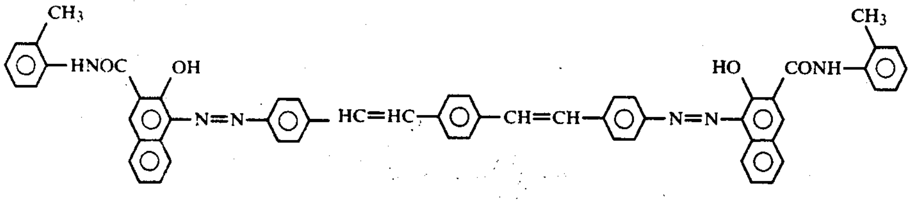
2.

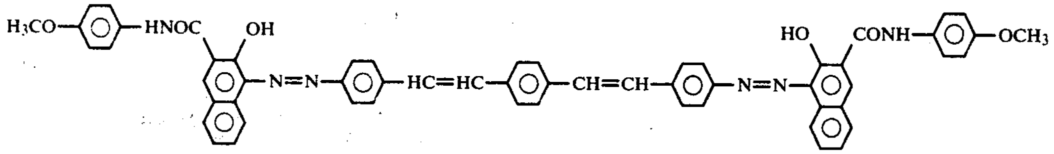
3.

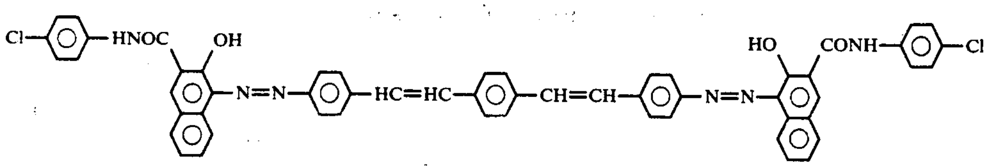
4.

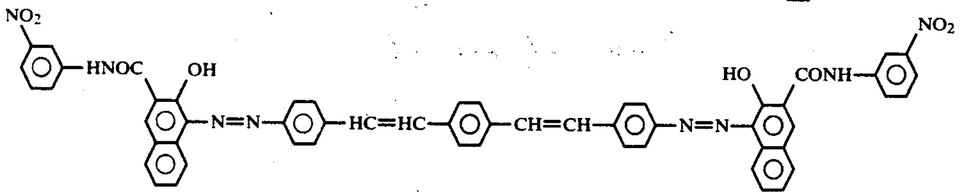
5.

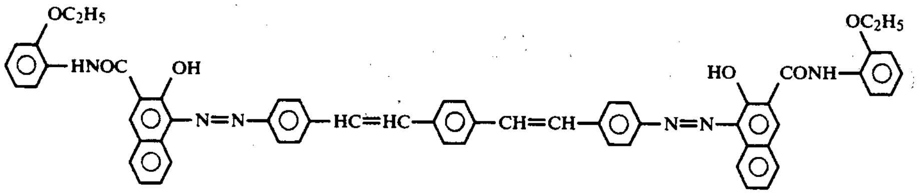
6.

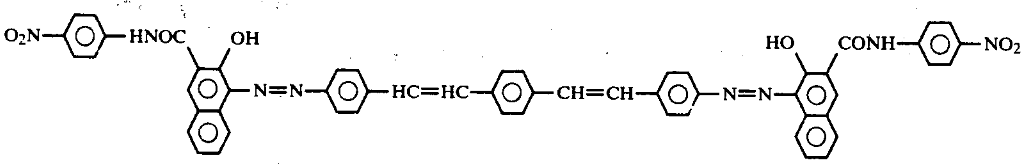
7.

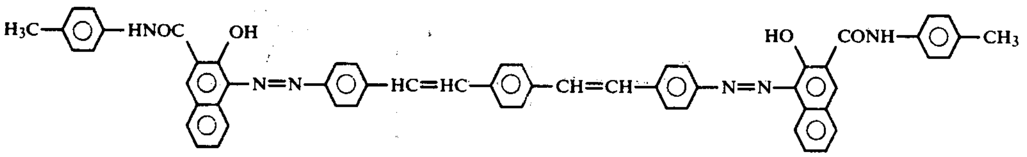
8.

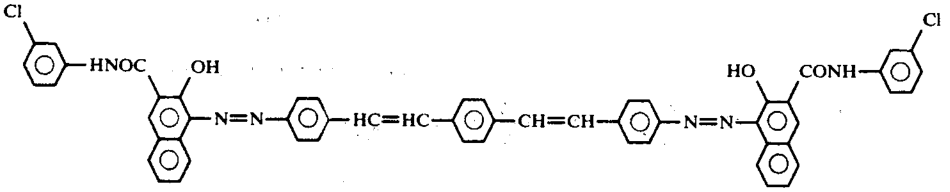
9.

-continued
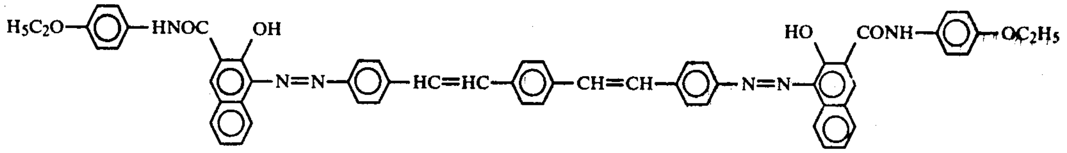
10.
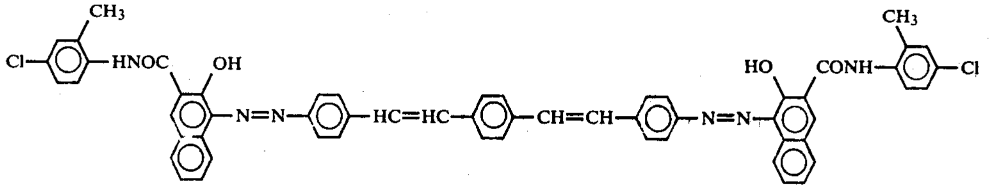
11.
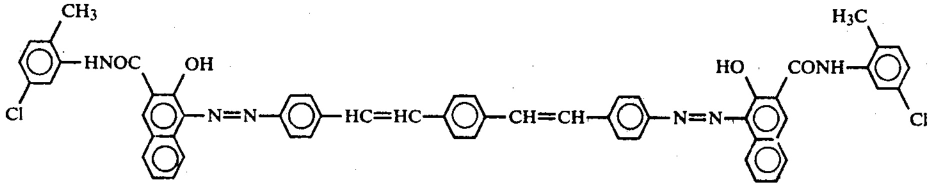
12.
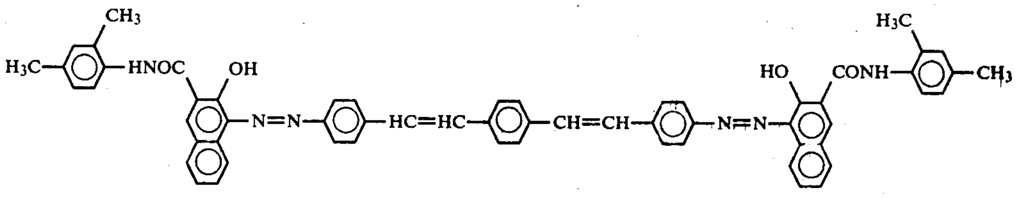
13.
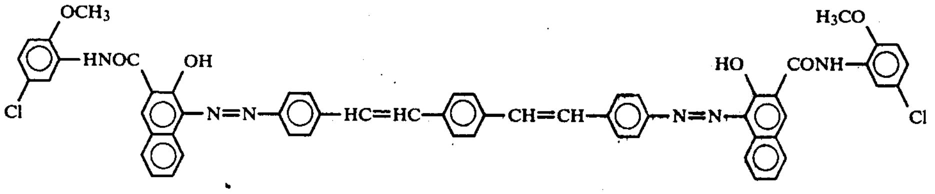
14.
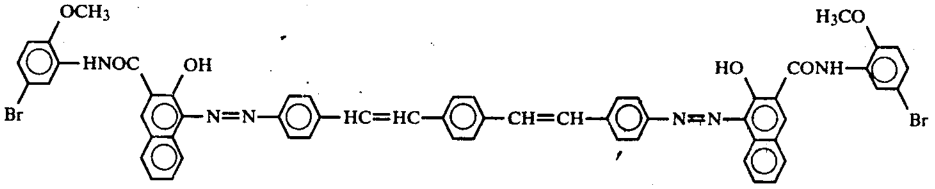
15.
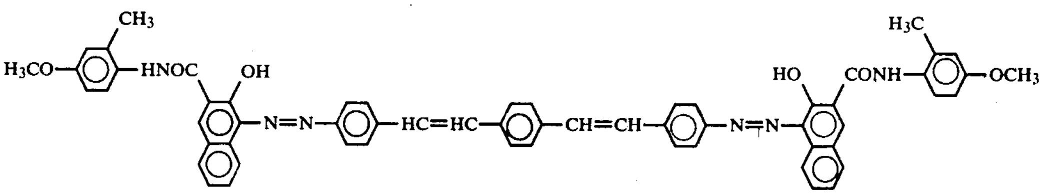
16.
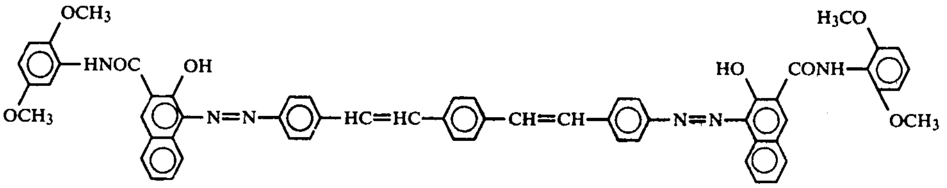
17.
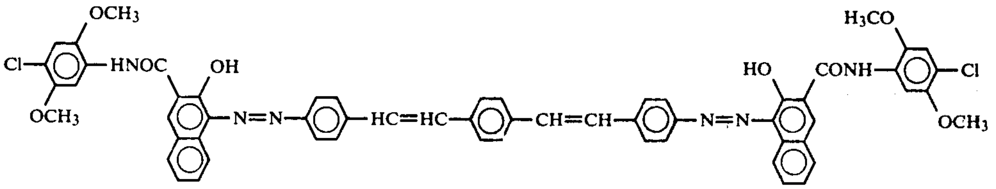
18.

-continued
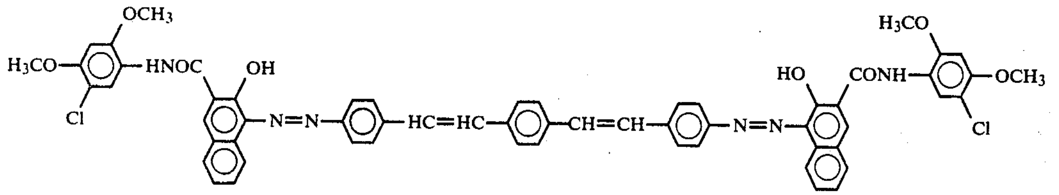
19.
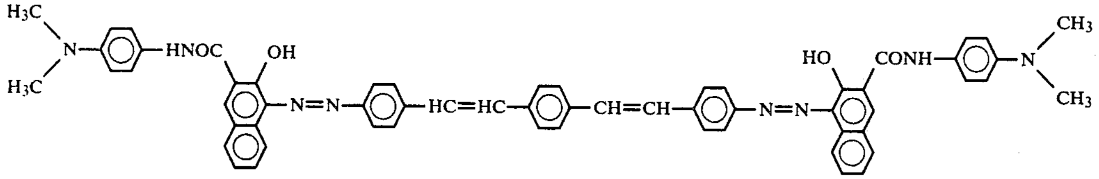
20.
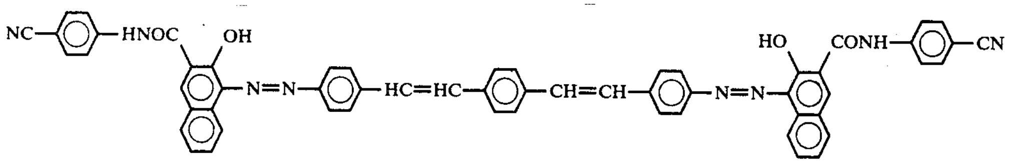
21.
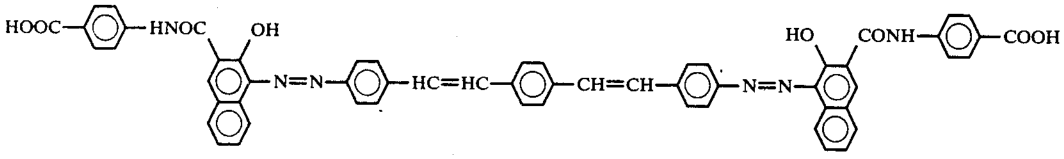
22.
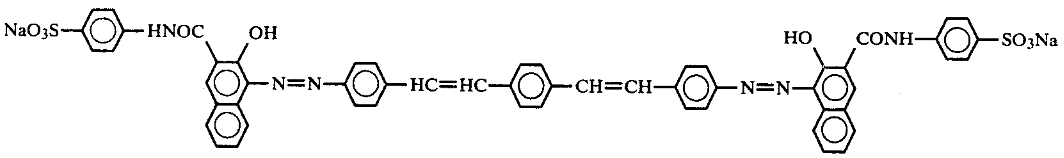
23.
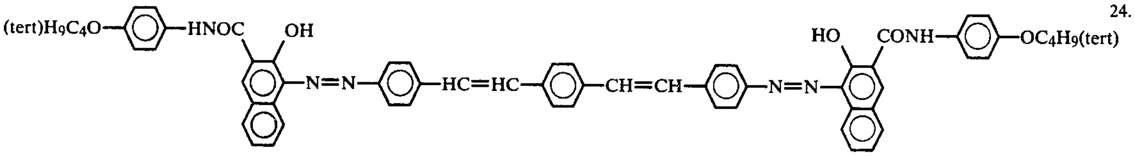
24.
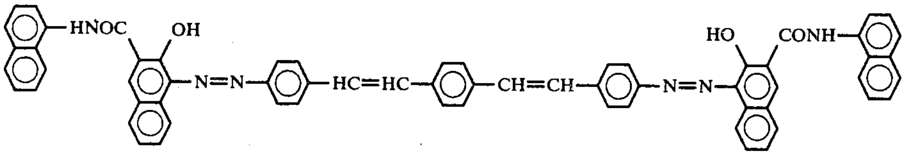
25.
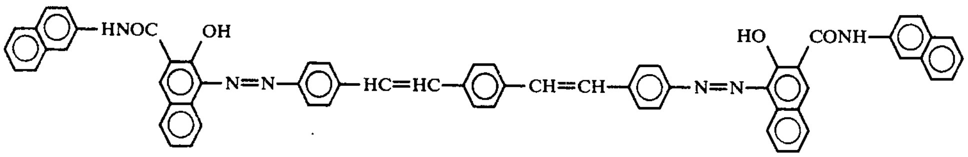
26.
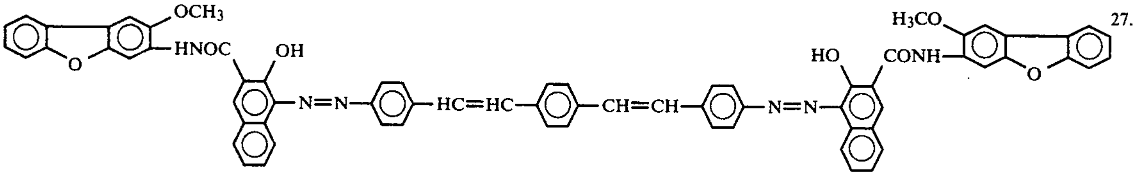
27.
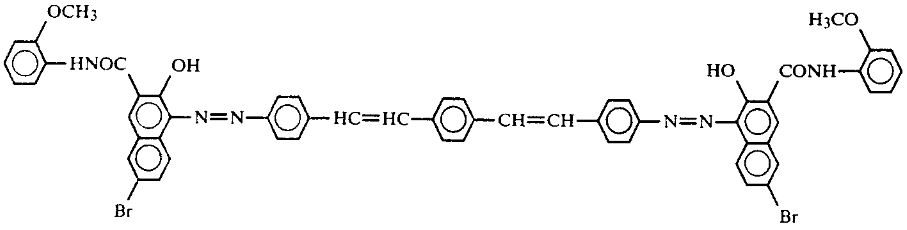
28.

-continued
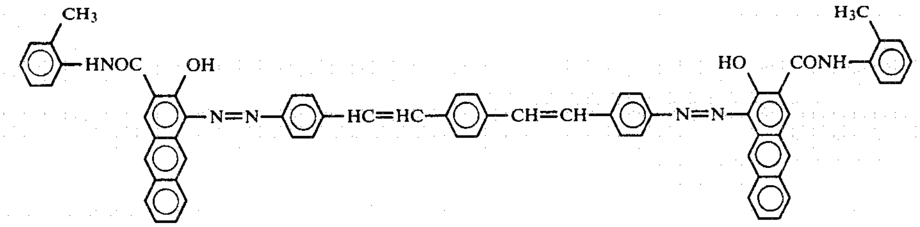
29.
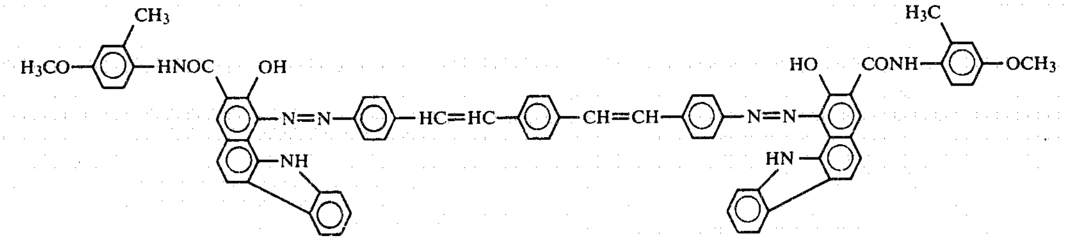
30.
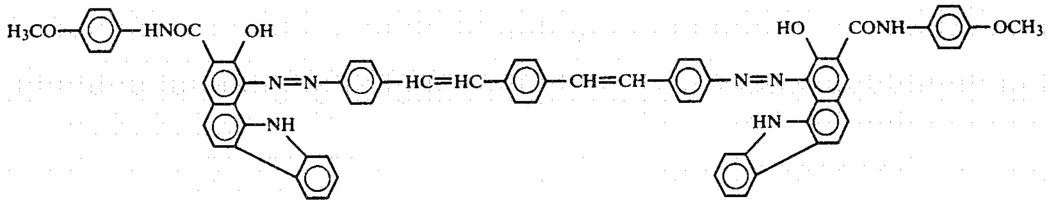
31.
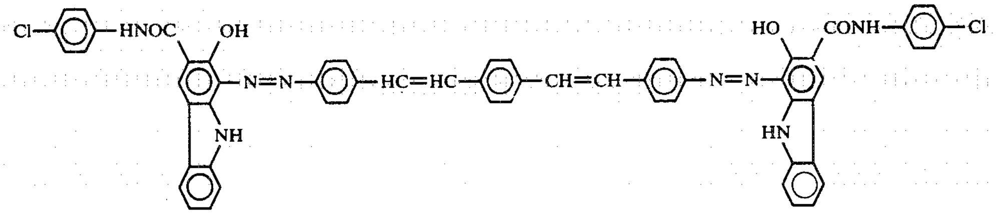
32.
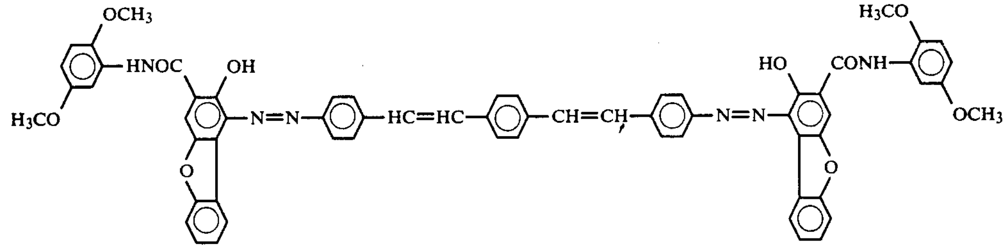
33.
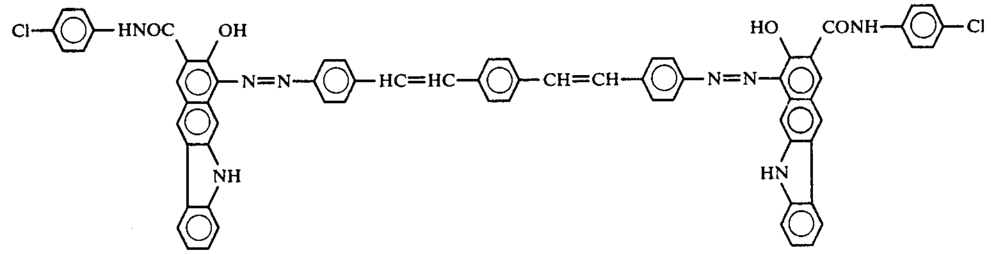
34.
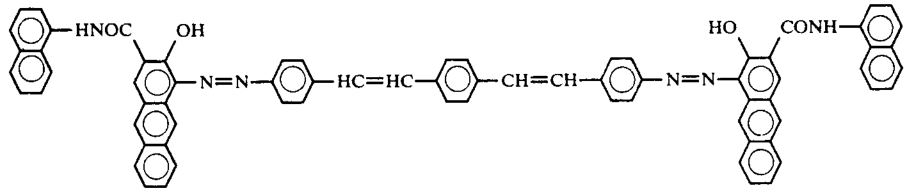
35.

-continued
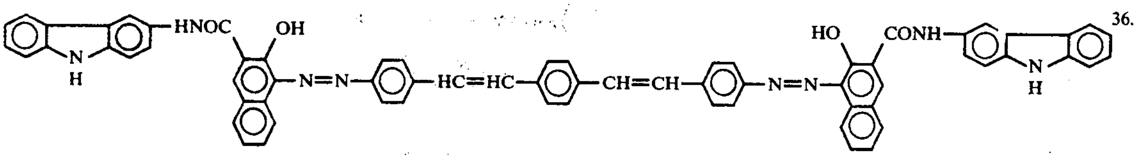
36.
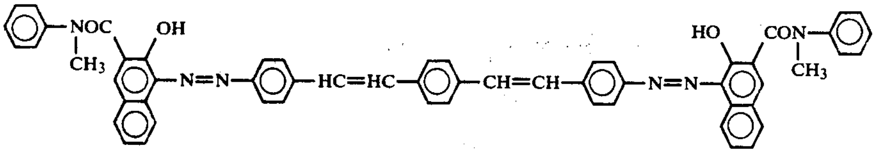
37.
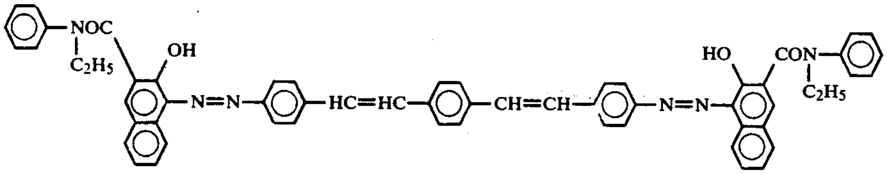
38.
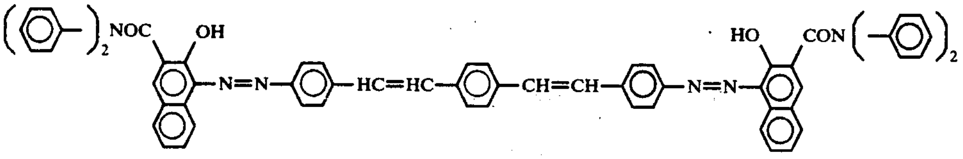
39.
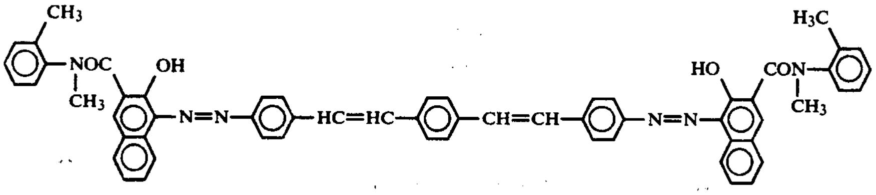
40.
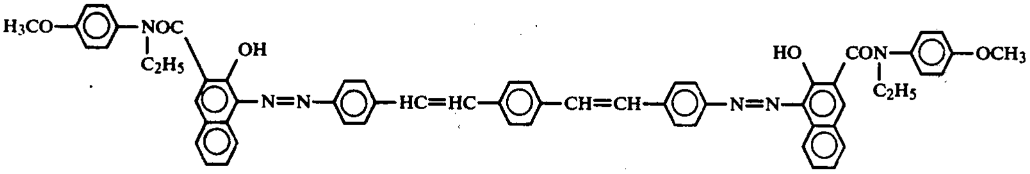
41.
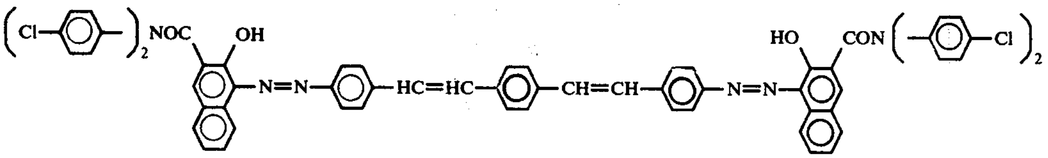
42.
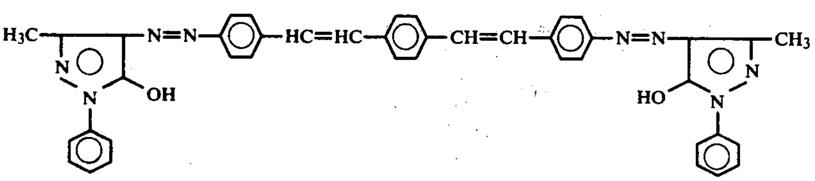
43.
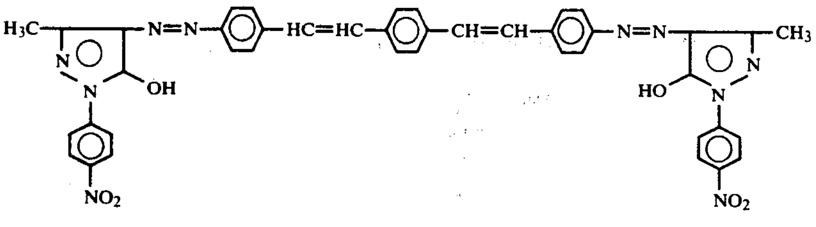
44.

-continued
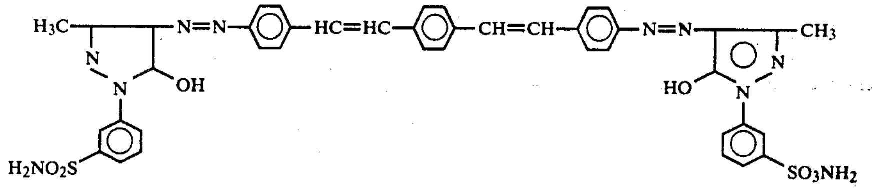
45.
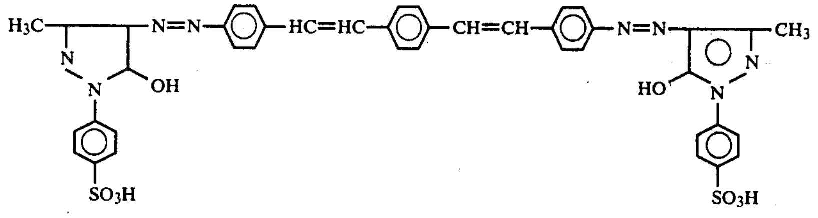
46.
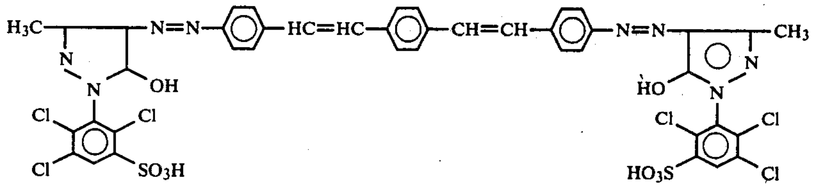
47.
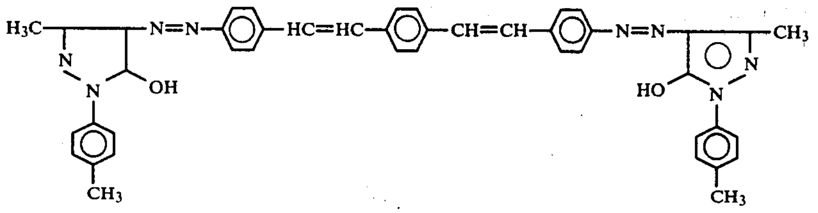
48.
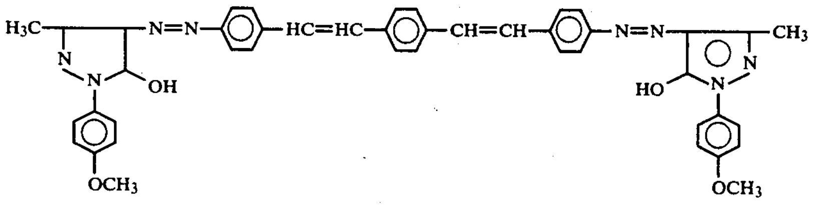
49.
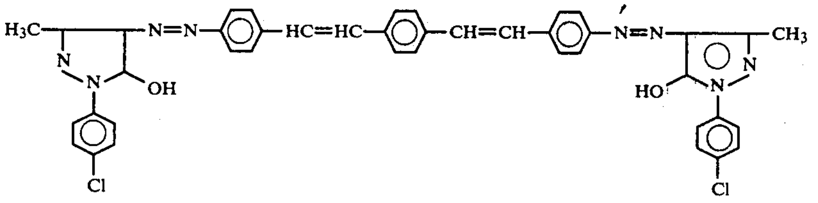
50.
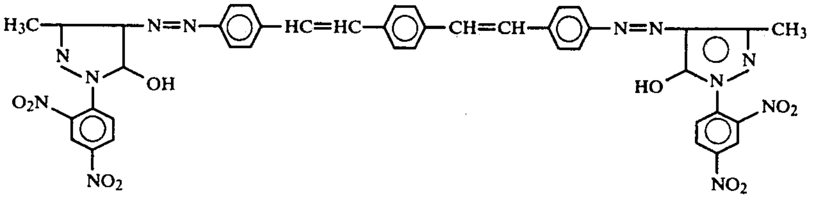
51.
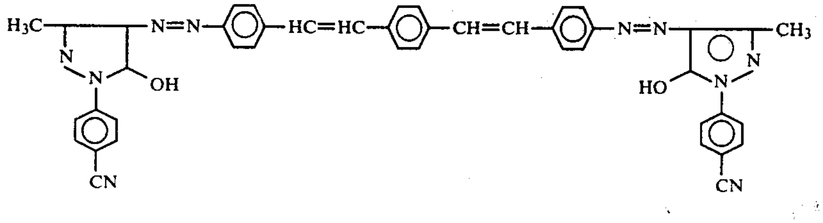
52.

-continued
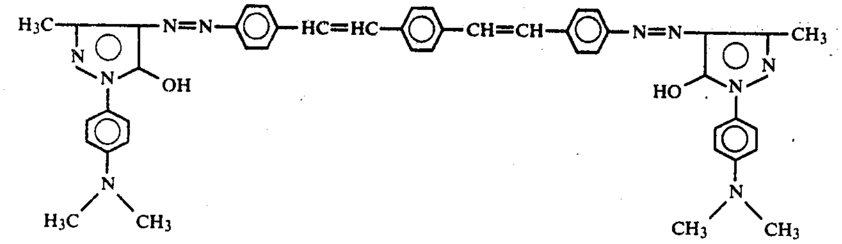
53.
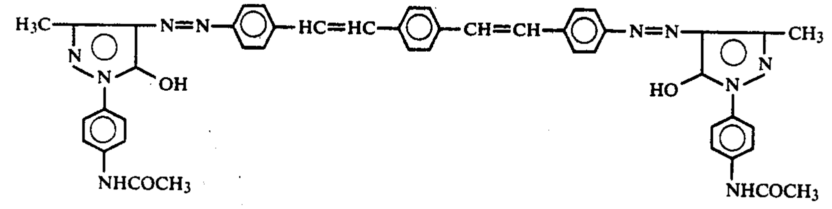
54.
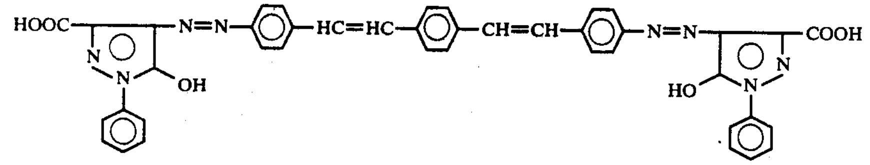
55.
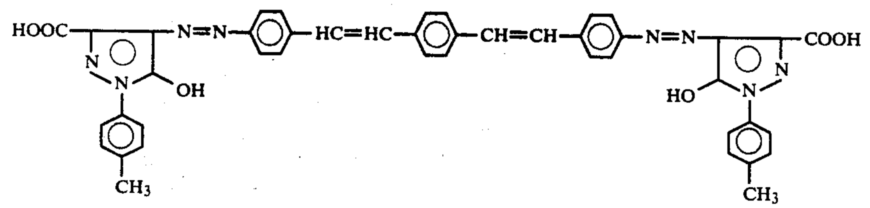
56.
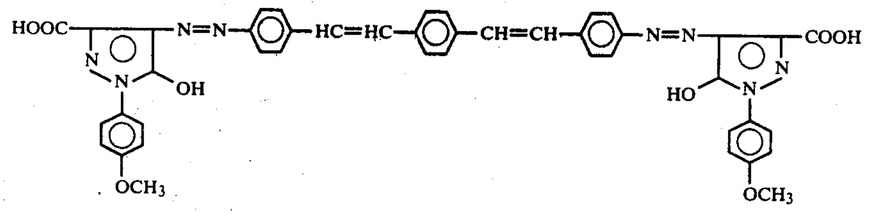
57.
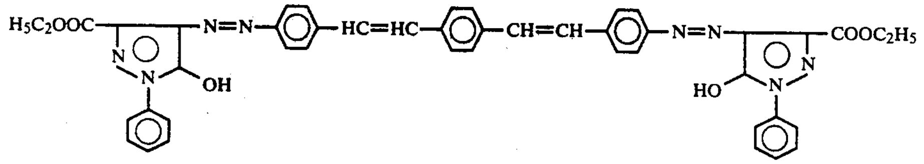
58.
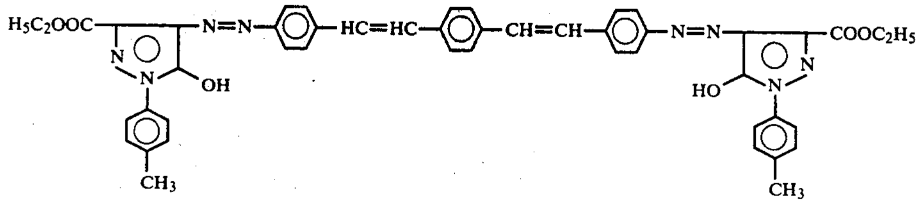
59.
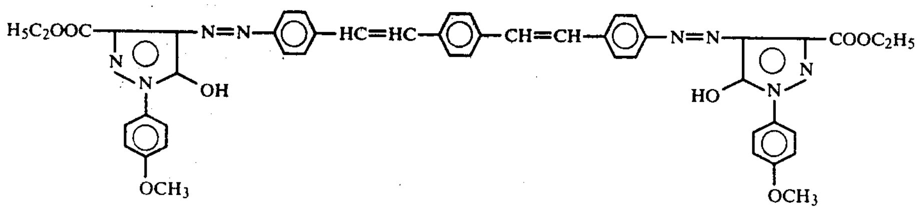
60.
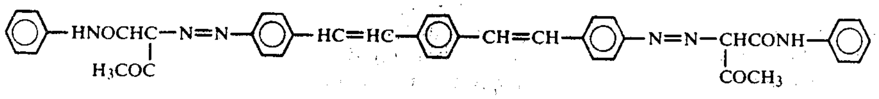
61.

-continued

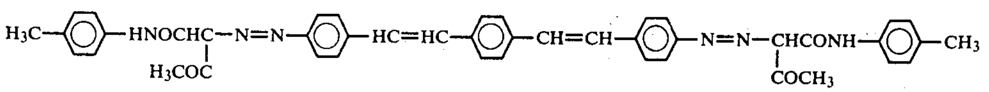

62.

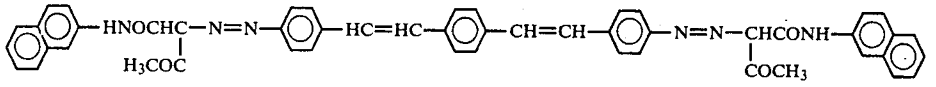

63.

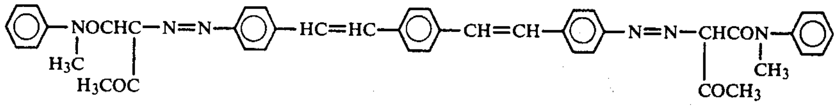

64.

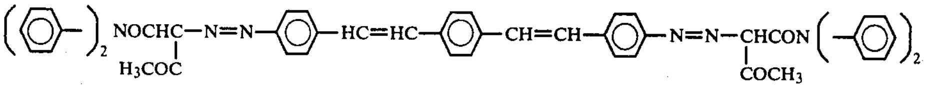

65.

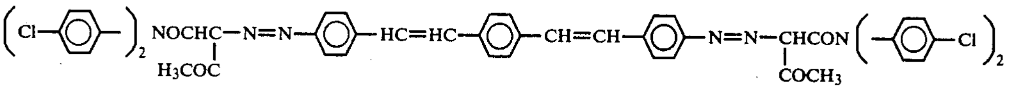

66.

These disazo compounds can also be prepared by the same process as that for the compounds expressed by the general formula I. That is, these disazo compounds can be easily prepared through the process comprising first diazotizing the starting material 1,4-bis(4-aminostyryl)benzene to precipitate tetrazonium salt and thereafter effecting coupling reaction of this tetrazonium salt with a coupler corresponding to the afore described various disazo compounds within an appropriate organic solvent such as N,N-dimethyl formamide in the presence of alkali. For instance, the process of preparing the disazo compound No. 1 expressed by the general formula II is as described in the following. Further, other disazo compounds can also be prepared by applying the same process save for changing the coupler.

The photosensitive materials according to the present invention contain the above mentioned disazo compounds and can assume such structure as illustrated in FIGS. 9 through 11 according to the way of application of these compounds. The photosensitive material illustrated in FIG. 9 is one prepared by forming a disazo compound 4 (which serves herein as a photoconductive substance)—resinous binder 3 type photosensitive layer 2 on a conductive support 1. The photosensitive material illustrated in FIG. 10 is one prepared by forming a disazo compound 4 (which serves herein as a charge-carrier generating substance)—charge-transfer medium (which is a mixture of a charge-transferable substance and a resinous binder) 5 type photosensitive layer 2′ on a conductive support 1. And, the photosensitive material illustrated in FIG. 11 is a modification of the photosensitive material in FIG. 10, and the photosensitive layer 2″ thereof is composed of a charge-carrier generating layer 6 consisting essentially of a disazo compound and a charge-transfer medium layer 7.

In the photosensitive material of FIG. 9, the disazo compound probably acts as a photoconductive substance, and generation and transfer of the charge-carrier necessary for light decay may be performed through the compound particles. In the case of the photosensitive material of FIG. 10, said charge-transfer substance probably forms a charge-transfer medium together with said binder (plus a plasticizer as occasion demands), while said disazo compound probably acts as a charge-carrier generating substance. This charge-transfer medium probably does not have any charge-carrier generating ability like disazo compounds, but has an ability to accept and transfer the charge-carrier generated by disazo compounds. That is, in the case of the photosensitive material of FIG. 10, generation of the charge-carrier necessary for light decay is probably performed by the disazo compound, while transfer of the charge-carrier is probably performed mainly by the charge-transfer medium. An essential condition further required for the charge-transfer medium on this occasion is that the range of the absorption wavelength of the charge-transfer medium should not fall on mainly the range of absorption wavelength of the visible region of the disazo compound. The reason for this is that, in order to generate the charge carrier efficiently in the disazo compound, it is necessary to transmit the light to the surface of the compound. This rule, however, does not apply to the case of, for instance, a photosensitive material which is only sensitive to a specific wavelength. Therefore, the absorption wavelength of the charge-transfer medium and that of the disazo compound should not completely overlap each other. Next, in the case of the photosensitive material of FIG. 11, the light after passing through the charge-transfer medium layer probably reaches to the photosensitive layer 2″ constituting a charge-carrier generating layer to cause generation of the charge-carrier in the disazo compound of this portion, while the charge-transfer medium layer accepts and transfers the charge-carrier pouring therein. The mechanism that generation of the charge-carrier necessary for light decay is performed by the disazo compound and transfer of the charge-carrier is performed by the charge-transfer medium in this photosensitive material is the same as in the case of the photosensitive material illustrated in FIG. 10. The disazo compound herein is also a charge-carrier generating substance.

In order to prepare the photosensitive material of FIG. 9, it suffices to coat a dispersion obtained by dispersing fine particles of a disazo compound in a binder solution on a conductive support and dry thereafter. In order to prepare the photosensitive material of FIG. 10, it suffices to disperse fine particles of a disazo compound in a solution obtained by dissolving a charge-transferable solution in a binder, coat the resulting dispersion on a conductive support, and dry thereafter. The photosensitive material of FIG. 11 can be obtained either by depositing a disazo compound on a conductive support through vacuum evaporation or through the procedure comprising dispersing fine particles of a disazo compound in an appropriate solvent containing a binder dissolved therein as occasion demands, coating the resulting dispersion on a conductive support and drying thereafter, subjecting the thus formed photosensitive layer to the surface finishing by, for instance, puff-grinding or the like, if necessary, thereby adjusting the thickness of the coating film, and thereafter coating thereon a solution containing a charge-transfer substance and a binder, followed by the drying. In any case, the disazo compound for use in the present invention is employed upon pulverizing into a particle size of less than 5μ, preferably less than 2μ, by means of a ball-mill or the like. Coating is performed by the conventional means such as doctor blade, wire bar, etc. The thickness of the photosensitive layer in the case of the photosensitive materials illustrated in FIGS. 9 and 10 is about 3 to 50μ, preferably 5 to 20μ. In the case of the photosensitive material illustrated in FIG. 11, the desirable thickness of the charge-carrier generating layer is less than 5μ, preferably less than 2μ, and the thickness of the charge-transfer medium layer is about 3 to 50μ, preferably 5 to 20μ. In the case of the photosensitive material illustrated in FIG. 9, the appropriate ratio of the disazo compound contained in the photosensitive layer is 30 to 70%, preferably about 50%, based on the weight of the photosensitive layer. (As described in the foregoing, in the case of the photosensitive material of FIG. 9, the disazo compound acts as a photoconductive substance, and generation and transfer of the charge carrier necessary for light decay are probably performed through the compound particles. Therefore, contact between the compound particles is desirable to be continuous from the photosensitive layer surface to the support. Accordingly, it is desirable that the ratio of the disazo compound to the photosensitive layer is as high as possible, but when both the strength and the sensitivity of the photosensitive layer are taken into consideration, it is preferably about 50 wt.%.) In the case of the photosensitive material illustrated in FIG. 10, the disazo compound accounts for 1 to 50 wt.%, preferably less than 20 wt.%, of the photosensitive layer, and the charge-transfer substance accounts for 10 to 95 wt.%, preferably 30 to 90 wt.%, of the photosensitive layer. And, in the case of the photosensitive material illustrated in FIG. 11, the ratio of the charge-transfer substance to the charge-transfer medium layer is 10 to 95 wt.%, preferably 30 to 90 wt.%, like in the case of the photosensitive material of FIG. 10. Further, in the preparation of all photosensitive materials illustrated in FIGS. 9 through 11, it is possible to employ some plasticizer jointly with the binder.

In the photosensitive materials according to the present invention, as the conductive support, a plate or foil of a metal such as aluminum, etc., a plastic film deposited with a metal such as aluminum, etc. through vacuum evaporation, or a paper processed for conductivity are useful.

As applicable binders, there can be cited such condensation resins as polyamide, polyurethane, polyester, epoxide resin, polyketone, polycarbonate, etc. and such vinyl polymers as polyvinyl ketone, polystyrene, poly-N-vinyl carbazole, polyacrylamide, etc.; yet, resins having insulating and adhesive properties are all useful.

As applicable plasticizers, there can be cited halogenated paraffin, polyvinyl chloride, dimethyl naphthalene, dibutyl phthalate, etc.

And, to cite applicable charge-transfer substances, as for high molecular substances, there are such vinyl polymers as poly-N-vinyl carbazole, halogenated poly-N-vinyl carbazole, polyvinyl pyrene, polyvinyl indroquinoxaline, polyvinyl dibenzothiophene, polyvinyl anthracene, polyvinyl acridine, etc. and such condensation resins as pyrene-formaldehyde resin, bromopyrene-formaldehyde resin, ethyl carbazole-formaldehyde resin, chloroethyl carbazole-formaldehyde resin, etc., and as for low moleculr substances (monomers) there are fluorenone, 2-nitro-9-fluorenone, 2,7-dinitro-9-fluorenone, 2,4,7-trinitro-9-fluorenone, 2,4,5,7-tetranitro-9-fluorenone, 4H-indeno[1,2-b]thiophene-4-one, 2-nitro-4H-indeno[1,2-b]thiophene-4-one, 2,6,8-trinitro-4H-indeno[1,2-b]thiophene-4-one, 8H-indeno[2,1-b]thiophene-8-one, 2-nitro-8H-indeno[2,1-b]thiphene-8-one, 2-bromo-6,8-dinitro-4H-indeno[1,2-b]thiophene, 6,8-dinitro-4H-indeno[1,2-b]thiophene, 2-nitrodibenzothiophene, 2,8-dinitrodibenzothiophene, 3-nitrodibenzothiophene-5-oxide, 3,7-dinitro-dibenzothiophene-5-oxide, 1,3,7-trinitro-dibenzothiophene-5,5-dioxide, 3-nitrodibenzothiophene-5,5-dioxide, 3,7-dinitro-dibenzothiophene-5,5-dioxide, 4-dicyanomethylene-4H-indeno[1,2-b]thiophene, 6,8-dinitro-4-dicyanomethylene-4H-indeno[1,2-b]thiophene, 1,3,7,9-tetranitrobenzo[c]cinnoline-5-oxide, 2,4,10-trinitrobenzo[c]cinnoline-6-oxide, 2,4,8-trinitrobenzo[c]cinnoline-6-oxide, 2,4,8-trinitrothioxanthone, 2,4,7-trinitro-9,10-phenanthrenequinone, 1,4-naphthoquinonebenzo[a]anthracene-7,12-dione, 2,4,7-trinitro-9-dicyanomethylene fluorene, tetrachlorophthalic anhydride, 1-bromopyrene, 1-methylpyrene, 1-ethylpyrene, 1-acetylpyrene, carbazole, N-ethylcarbazole, N-β-chloroethyl carbazole, N-β-hydroxyethyl carbazole, 2-phenyl indole, 2-phenyl naphthalene, 2,5-bis(4-diethylaminophenyl)-1,3,4-oxadiazole, 2,5-bis(4-diethylaminophenyl)-1,3,4-triazole, 1-phenyl-3-(4-diethylaminostyryl)-5-(4-diethylaminophenyl)pyrazoline, 2-phenyl-4-(4-diethylaminophenyl)-5-phenyl oxazole, triphenyl amine, tris(4-diethylaminophenyl)methane, 3,6-bis(dibenzylamino)-9-ethyl carbazole, etc. These charge-transfer substances are employed either singly or as a mixture of two or more of them.

Further, all of the photosensitive materials thus prepared can be provided with an adhesive layer or a barrier layer disposed in between the conductive support and the photosensitive layer as occasion demands. As the material for use in forming these layers, polyamide, nitrocellulose, aluminum oxide, etc. are appropriate, and the thickness of the layers is preferably less than 1μ.

In order to perform the copying by using a photosensitive material under the present invention, it suffices to follow the procedure that the photosensitive layer side of the photosensitive material is electrified and exposed to light, and then developing is conducted, followed by, if necessary, transfer onto an ordinary paper or the like and fixing.

The photosensitive material under the present invention have excellent advantages such that they are generally high in sensitivity and rich in flexibility.

DESCRIPTION OF THE PREFERRED EMBODIMENTS

EXAMPLE 1

Preparation of Compound No. 1 expressed by general formula I (cf. Table-1)

25.9 g of 1,4-bis(4-nitrostyryl)benzene were added to a mixture consisting of 50 g of iron powder, 12 ml of undiluted hydrochloric acid, 50 ml of water and 800 ml of N,N-dimethyl formamide and subjected to 1.5 hours' intense stirring at a temperature in the range of from 90° to 100° C. Thereafter, the pH value was adjusted to be 8 by means of 10% aqueous solution of sodium carbonate while thus heating, and the undissolved matter was filtered. From the resulting filtrate were separated yellow crystals, and these crystals were collected by filtering, washed in water, dried, and thereafter recrystallized from N,N-dimethyl formaldehyde, whereby there were obtained 20.9 g (yield rate: 95.7%) of 1,4-bis(4-aminostyryl)benzene in the form of yellow crystals (melting point: 300° C. or more).

| Elementary analysis value | Theoretical value ($C_{22}H_{20}N_2$) | Actual value |
|---|---|---|
| C(%) | 84.58 | 84.30 |
| H(%) | 6.45 | 6.46 |
| N(%) | 8.97 | 8.95 |

Figure 1:
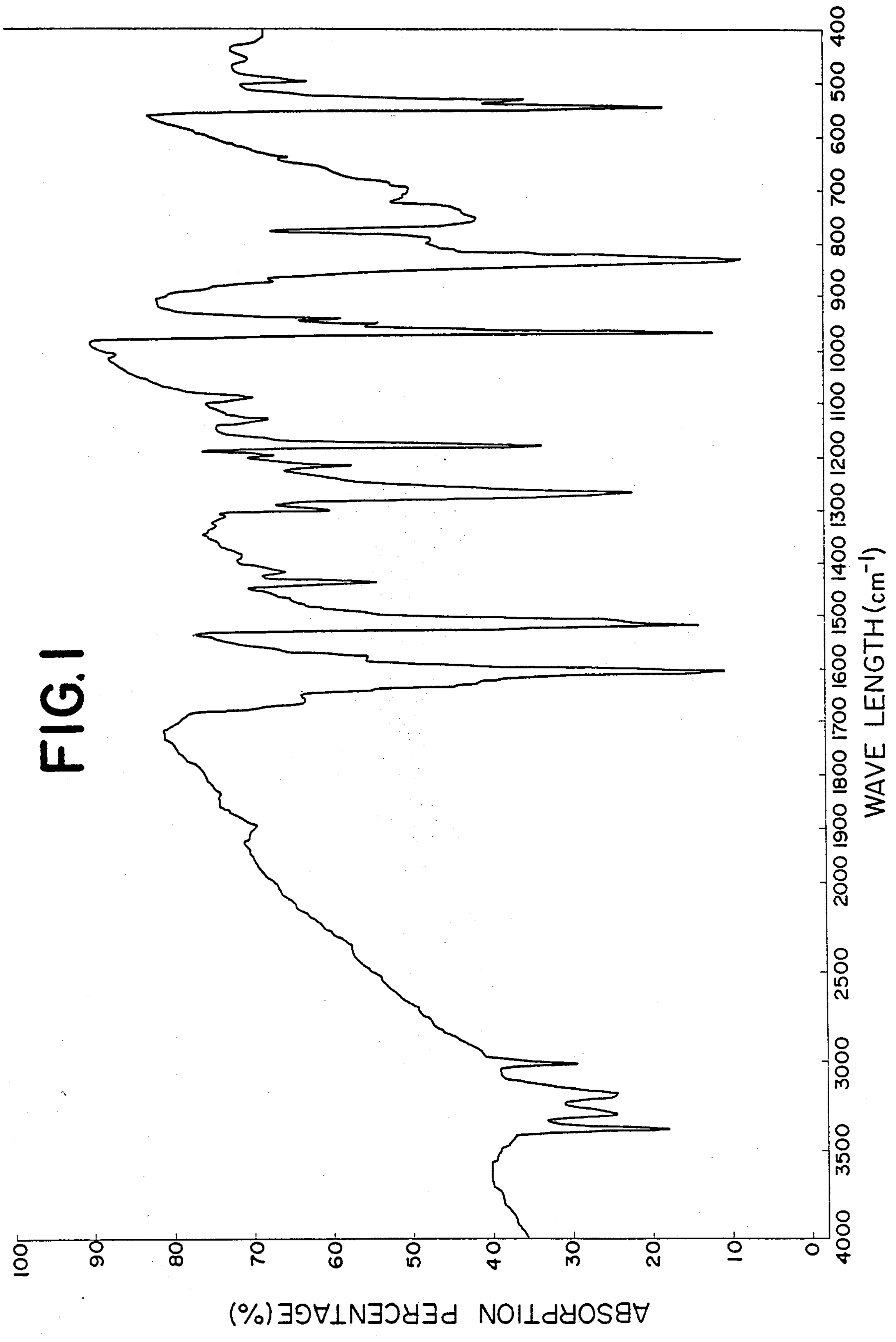
FIG. 1 is the infrared absorption spectrum of 1,4-bis(4-aminostyryl)benzene used as an intermediate for the preparation of disazo compounds expressed by the general formula I according to the present invention.

Infrared absorption spectrum (according to KBr tablet process)
$\nu$NH : 3400 to 3500 $cm^{-1}$
$\delta$trans.—(CH = CH): 962 $cm^{-1}$ Shown in FIG. 1 is the infrared absorption spectrum of this crystal.

16.1 g of the thus obtained 1,4-bis(4-aminostyryl)benzene together with dilute hydrochloric acid prepared by using 100 ml of undiluted hydrochloric acid and 100 ml of water were thoroughly stirred for about 30 minutes at a temperature of 60° C. Next, the resulting mixture was cooled down to a temperature of about 0° C., and then a solution prepared by dissolving 7.5 g of sodium nitrite in 12 ml of water was added thereto in about 30 minutes at a temperature of −1° to 0° C. Subsequently, the mixture was stirred for about 30 minutes at the same temperature, and a small amount of unreacted matter was filtered. The resulting filtrate was poured in 80 ml of 42% borofluoric acid, and the crystals separated thereby were collected by filtering, washed in water and dried, whereby there were obtained 26.5 g (yield rate: 89.8%) of tetrazonium difluoroborate as orange-red crystals (decomposition point: about 130° C.).

2.0 g of the thus obtained tetrazonium salt together with 2.2 g of 2-hydroxy-3-naphthoic acid anilide as a coupling ingredient were dissolved in 370 ml of cooled N,N-dimethyl formamide, and to the resulting solution were added dropwise a solution consisting of 3.9 g of sodium acetate and 62 ml of water in one hour at a temperature of 4° to 8° C. Thereafter, cooling was discontinued, and 3 hours' stirring was performed at room temperature. The resulting precipitate was collected by filtering, was washed 3 times with 300 ml of water, and then rinsed 8 times with 300 ml of N,N-dimethyl formamide. Subsequently, by rinsing out N,N-dimethyl formamide with acetone and drying at a temperature of 70° C. and under a reduced pressure of 2 mmHg, there were obtained 2.9 g (yield rate: 85.3%) of a disazo compound corresponding to Compound No. 1 expressed by the general formula I.

EXAMPLES 2 THROUGH 14

Preparation of disazo compounds No. II(Example 2), No. III(Example 3), No. IV(Example 4), No. V(Example 5), No. VI(Example 6), No. VII(Example 7), No. VIII(Example 8), No. IX(Example 9), No. X(Example 10), No. XI(Example 11) No. XII(Example 12), No. XIII(Example 13) and No. XIV (Example 14) according to general formula I (cf. Table-1)

Through the same procedure as in Example 1 save for the employment of the respective compounds listed in the following Table-2 as coupling ingredient, various disazo compounds No. II through No. XIV were prepared.

Table-2

| Compound No. | Coupling ingredient | Compound No. | Coupling ingredient |
|---|---|---|---|
| II | 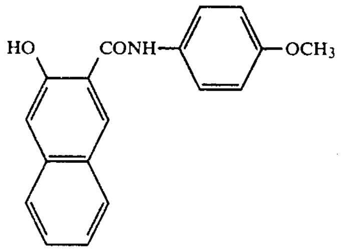 | IX | 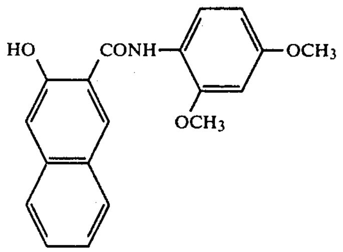 |
| III | 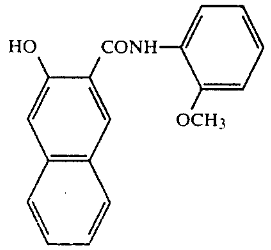 | X | 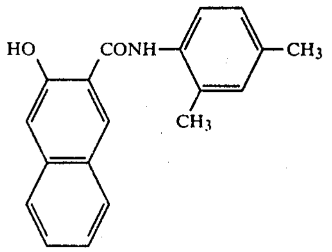 |

Table-2-continued

| Compound No. | Coupling ingredient | Compound No. | Coupling ingredient |
|---|---|---|---|
| IV | 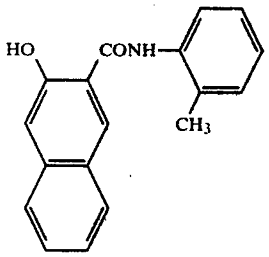 | XI | 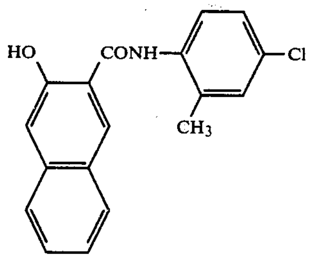 |
| V | 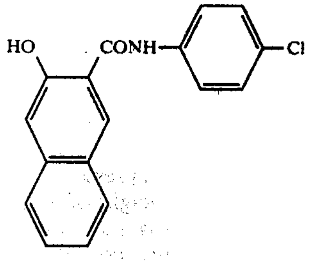 | XII | 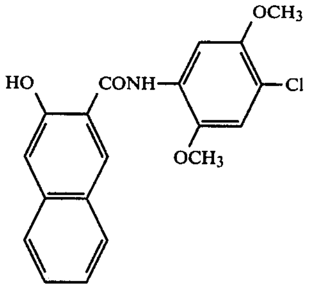 |
| VI | 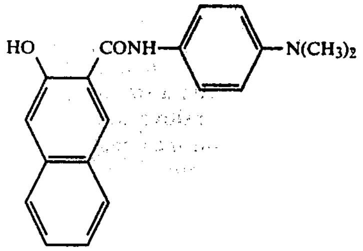 | XIII | 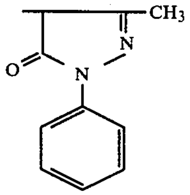 |
| VII | 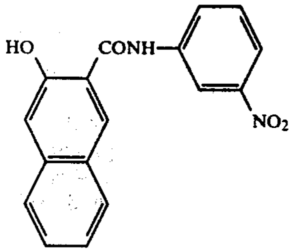 | XIV | 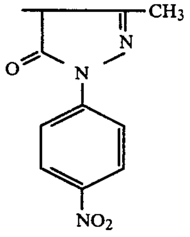 |
| VIII | 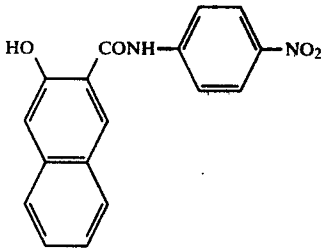 | | |

EXAMPLE 14

Preparation of electrophotographic sensitive material 1 part by weight of polyester resin (namely, Polyester Adhesive 49000, the manufacture of Du Pont Inc.), 1 part by weight of the disazo compound No. 1 expressed by the general formula II and 26 parts by weight of tetrahydrofuran were pulverized and mixed together within a ball-mill, and the resulting dispersion was coated, by means of a doctor blade, on a polyester film deposited with aluminum through vacuum evaporation and was dried at a temperature of 100° C. for 10 minutes, whereby there was obtained a photosensitive material having a 7μ-thick photosensitive layer and a structure as illustrated in FIG. 9.

Subsequently, after charging positive electricity on the photosensitive layer side of this photosensitive material by applying +6 KV corona discharge for 20 seconds by means of a commercial electrostatic copying paper testing apparatus, the photosensitive material was left alone in the dark for 20 seconds, and the surface potential Vpo(volt) at that time was measured. Next, light was applied to the photosensitive layer by means of a tungsten lamp so as to attain the illumination of 20 luxes on the surface thereof, and the time (unit: second) required for reducing said surface potential Vpo to half was sought, whereby the amount of exposure $E_{\frac{1}{2}}$(lux-sec.) was obtained. The result was as follows:

Vpo=720 V, $E_{\frac{1}{2}}$=6.5 lux·sec.

EXAMPLES 15 THROUGH 23

Preparation of electrophotographic sensitive materials

Varieties of photosensitive materials were prepared by applying the same procedure as in Example 14 save for employing the respective disazo compounds referred to by number in the following Table-3 in place of the disazo compound No. 1 used in Example 14. When these photosensitive materials were subsequently subjected to the same measurement of Vpo and $E_{\frac{1}{2}}$ as in Example 14, the result was as shown in Table-3, respectively.

Table-3

| Example No. | Disazo compound No. | Vpo (volt) | $E_{\frac{1}{2}}$ (lux . sec.) |
|---|---|---|---|
| 15 | 4 | 760 | 7.1 |
| 16 | 17 | 710 | 4.2 |
| 17 | 18 | 700 | 13.0 |
| 18 | 32 | 730 | 15.6 |
| 19 | 37 | 690 | 29.3 |
| 20 | 49 | 695 | 18.0 |
| 21 | 58 | 710 | 23.5 |
| 22 | 62 | 720 | 21.6 |
| 23 | 65 | 800 | 31.0 |

EXAMPLE 24

Preparation of electrophotographic sensitive material 10 parts by weight of the same polyester resin as in Example 14, 10 parts by weight of 2,4,7-trinitro-9-fluorenone, 2 parts by weight of the disazo compound No. 1 expressed by the general formula II and 198 parts by weight of tetrahydrofuran were pulverized and mixed together within a ball-mill, and the resulting dispersion was coated, by means of a doctor blade, on a polyester film deposited with aluminum through vacuum evaporation and was dried at a temperature of 100° C. for 10 minutes, whereby there was obtained a photosensitive material having a 10μ-thick photosensitive layer and a structure illustrated in FIG. 10. Subsequently, measurement of Vpo and $E_{\frac{1}{2}}$ of this photosensitive material was conducted through the same procedure as in Example 14 save for applying −6 KV corona discharge instead of +6 KV corona discharge employed in Example 14. The result was as follows:

Vpo=480 V, $E_{\frac{1}{2}}$=13.0 lux·sec.

EXAMPLES 25 THROUGH 33

Preparation of electrophotographic sensitive materials

Varieties of photosensitive materials having a structure illustrated in FIG. 10 were prepared by applying the same procedure as in Example 24 save for employing the respective disazo compounds referred to by number in the following Table-4 in place of the disazo compound No. 1 used in Example 24. When these photosensitive materials were subsequently subjected to the same measurement of Vpo and $E_{\frac{1}{2}}$ as in Example 24, the result was as shown in Table-4, respectively.

Table-4

| Example No. | Disazo compound No. | Vpo (volt) | $E_{\frac{1}{2}}$ (lux . sec.) |
|---|---|---|---|
| 25 | 3 | 690 | 8.0 |
| 26 | 5 | 705 | 15.3 |
| 27 | 11 | 670 | 19.1 |
| 28 | 23 | 650 | 23.4 |
| 29 | 25 | 710 | 31.2 |
| 30 | 35 | 630 | 19.3 |
| 31 | 38 | 700 | 29.9 |
| 32 | 41 | 710 | 35.0 |
| 33 | 60 | 655 | 30.5 |

EXAMPLE 34

Figure 2:
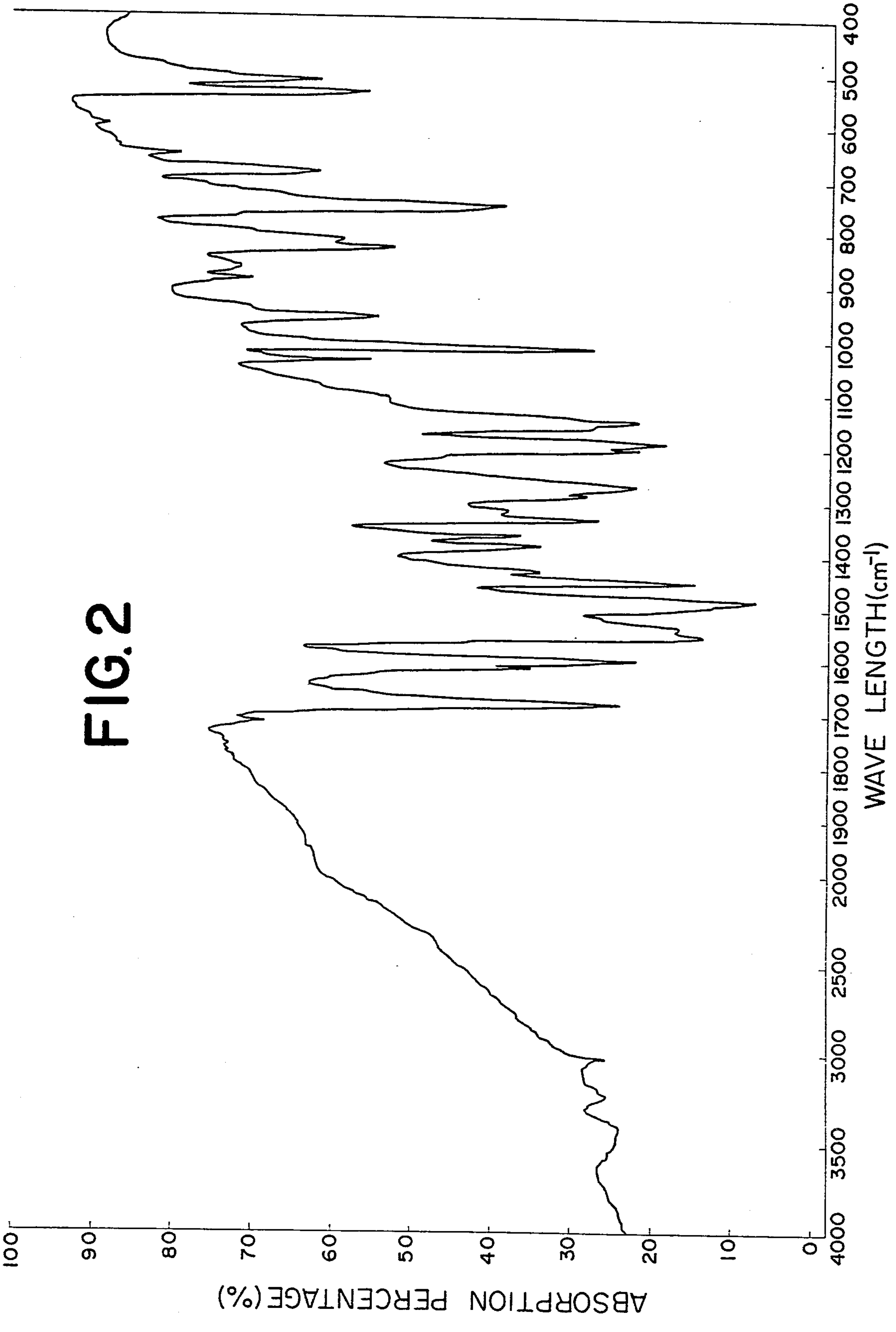

Preparation of electrophotographic sensitive material 10 parts by weight of the same polyester resin as in Example 14, 10 parts by weight of 2,5-bis(4-diethylaminophenyl)1,3,4-oxadiazole, 2 parts by weight of the disazo compound No. 1 expressed by the general formula II and 198 parts by weight of tetrahydrofuran were pulverized and mixed together within a ballmill, and the resulting dispersion was coated, by means of a doctor blade, on a polyester film deposited with aluminum through vacuum evaporation and was dried at a temperature of 120° C. for 10 minutes, whereby there was prepared a photosensitive material having a 10μ-thick photosensitive layer and a structure illustrated in FIG. 2. When this photosensitive material was subsequently subjected to the same measurement as in Example 14, the result was as follows:

Vpo=810 V, $E_{\frac{1}{2}}$=8.2 lux·sec.

EXAMPLES 35 THROUGH 43

Preparation of electrophotographic sensitive materials

Varieties of photosensitive materials having a structure illustrated in FIG. 10 were prepared by applying the same procedure as in Example 34 save for employing the respective disazo compounds referred to by number in the following Table-5 in place of the disazo compound No. 1 used in Example 34. When these photosensitive materials were subsequently subjected to the same measurement of Vpo and $E_{\frac{1}{2}}$ as in Example 14, the result was as shown in Table-5, respectively.

Table-5

| Example No. | Disazo compound No. | Vpo (volt) | $E_{\frac{1}{2}}$ (lux . sec.) |
|---|---|---|---|
| 35 | 2 | 790 | 6.0 |
| 36 | 9 | 815 | 11.3 |
| 37 | 13 | 780 | 10.5 |
| 38 | 28 | 800 | 14.1 |
| 39 | 33 | 910 | 8.0 |
| 40 | 45 | 820 | 12.4 |
| 41 | 47 | 880 | 35.0 |
| 42 | 52 | 830 | 20.6 |
| 43 | 66 | 850 | 25.2 |

EXAMPLE 44

Preparation of electrophotographic sensitive material 200 parts by weight of poly-N-vinyl carbazole, 33 parts by weight of 2,4,7-trinitro-9-fluorenone, 20 parts by weight of polyester resin (the same as in Example 14) and 20 parts by weight of the disazo compound No. 1 expressed by the general formula II as added to 1780 parts by weight of tetrahydrofuran were pulverized and mixed together within a ball-mill, and the resulting dispersion was coated, by means of a doctor blade, on a polyester film deposited with aluminum through vacuum evaporation and was dried at a temperature of 100° C. for 10 minutes, whereby there was prepared a photosensitive material having a 13μ-thick photosensitive layer and a structure illustrated in FIG. 10. When this photosensitive material was subjected to the same measurement as in Example 14, the result was as follows:

Vpo=1035 V, E½=4.0 lux·sec.

EXAMPLES 45 THROUGH 53

Preparation of electrophotographic sensitive materials

Varieties of photosensitive materials having a structure illustrated in FIG. 10 were prepared by applying the same procedure as in Example 44 save for employing the respective disazo compounds referred to by number in the following Table-6 in place of the disazo compound No. 1 used in Example 44. When these photosensitive materials were subsequently subjected to the same measurement of Vpo and E½ as in Example 14, the result was as shown in Table-6, respectively.

Table-6

| Example No. | Disazo compound No. | Vpo (volt) | E½ (lux . sec.) |
|---|---|---|---|
| 45 | 9 | 1250 | 8.0 |
| 46 | 10 | 1050 | 4.2 |
| 47 | 17 | 1100 | 2.6 |
| 48 | 29 | 1000 | 3.3 |
| 49 | 40 | 1050 | 8.0 |
| 50 | 42 | 1200 | 10.5 |
| 51 | 51 | 1300 | 14.1 |
| 52 | 63 | 990 | 5.0 |
| 53 | 64 | 1010 | 8.2 |

EXAMPLE 54

Preparation of electrophotographic sensitive material 2 parts by weight of the disazo compound No. 1 expressed by the general formula II and 98 parts by weight of tetrahydrofuran were pulverized and mixed together within a ball-mill, and the resulting dispersion was coated, by means of a doctor blade, on a polyester film deposited with aluminum through vacuum evaporation and was subjected to natural drying, whereby there was formed a 1μ-thick charge-carrier generating layer. Meanwhile, another dispersion was prepared by mixing 2 parts by weight of 2,4,7-trinitro-9-fluorenone, 2 parts by weight of polycarbonate (namely, Panlite L, the manufacture of TEIJIN Co., Ltd.) and 46 parts by weight of tetrahydrofuran together, and this dispersion was coated on the foregoing charge-carrier generating layer by means of a doctor blade and then dried at a temperature of 100° C. for 10 minutes to form a 10μ-thick charge-transfer medium layer, whereby there was obtained a photosensitive material having a structure illustrated in FIG. 11. When the thus obtained photosensitive material was subjected to the same measurement as in Example 14, the result was as follows:

Vpo=850 V, E½=14.3 lux·sec.

EXAMPLES 55 THROUGH 63

Preparation of electrophotographic sensitive materials

Varieties of photosensitive materials having a structure illustrated in FIG. 11 were prepared by applying the same procedure as in Example 54 save for employing the respective disazo compounds referred to by number in the following Table-7 in place of the disazo compound No. 1 used in Example 54. When these photosensitive materials were subjected to the same measurement as in Example 14, the result was as shown in Table-7, respectively.

Table-7

| Example No. | Disazo compound no. | Vpo (volt) | E½ (lux . sec.) |
|---|---|---|---|
| 55 | 8 | 890 | 12.1 |
| 56 | 15 | 900 | 4.0 |
| 57 | 21 | 870 | 10.2 |
| 58 | 30 | 900 | 13.5 |
| 59 | 33 | 920 | 8.0 |
| 60 | 43 | 980 | 29.3 |
| 61 | 53 | 910 | 30.4 |
| 62 | 55 | 1010 | 25.0 |
| 63 | 61 | 950 | 10.6 |

EXAMPLE 64

Preparation of electrophotographic sensitive material 2 parts by weight of the disazo compound No. 1 expressed by the general formula II and 98 parts by weight of tetrahydrofuran were pulverized and mixed together within a ball-mill, and the resulting dispersion was coated, by means of a doctor blade, on a polyester film deposited with aluminum through vacuum evaporation and was subjected to natural drying, whereby there was formed a 1μ-thick charge-carrier generating layer. Meanwhile, another dispersion was prepared by mixing 2 parts by weight of 2,5-bis(4-diethylaminophenyl)-1,3,4-oxadiazole, 2 parts by weight polycarbonate (the same as in Example 54) and 46 parts by weight of tetrahydrofuran together, and this dispersion was coated on the foregoing charge-carrier generating layer by means of a doctor blade and then dried at a temperature of 120° C. for 10 minutes to form a 10μ-thick charge-transfer medium layer, whereby there was obtained a laminate type photosensitive material illustrated in FIG. 11. When the thus obtained photosensitive material was subjected to the same measurement of Vpo and E½ as in Example 14, the result was as follows:

Vpo=980 V, E½=8.2 lux·sec.

EXAMPLES 65 THROUGH 73

Preparation of electrophotographic sensitive materials

Varieties of photosensitive materials having the same structure as that of Example 64 were prepared by employing the respective disazo compounds referred to by number in the following Table-8 in place of the disazo compound No. 1 used in Example 64. When these photosensitive materials were subjected to the same measurement of Vpo and E½ as in Example 14, the result was as shown in Table-8, respectively.

Table-8

| Example No. | Disazo compound No. | Vpo (volt) | $E_{\frac{1}{2}}$ (lux . sec.) |
|---|---|---|---|
| 65 | 6 | 1150 | 6.8 |
| 66 | 14 | 990 | 13.0 |
| 67 | 19 | 1100 | 8.3 |
| 68 | 22 | 1050 | 5.0 |
| 69 | 27 | 1200 | 11.5 |
| 70 | 36 | 990 | 19.4 |
| 71 | 44 | 1000 | 9.0 |
| 72 | 48 | 980 | 10.1 |
| 73 | 53 | 975 | 21.0 |

EXAMPLE 74 and Comparative Examples 1 through 4

Comparison with well-known electrophotographic sensitive materials 2 varieties of dispersion-type photosensitive materials having a structure illustrated in FIG. 10 were prepared by applying the same procedure as in Example 44 save for replacing the disazo compound No. 1 used in Example 44 with the respective disazo ccompounds described in U.S. Pat. No. 3,898,084 and U.S. Pat. No. 4,052,210 (cf. Comparative Examples 1 and 3 in the following Table-9) in an equivalent thereto.

Further, 3 varieties of laminate-type photosensitive materials having a structure illustrated in FIG. 11 were prepared by applying the same procedure as in Example 64 save for replacing the disazo compound No. 1 used in Example 64 with the disazo compound No. 13 (cf. Example 74 in Table-9) and the disazo compounds described in the foregoing U.S. Pat. Nos. (to wit, Comparative Examples 2 and 4 in Table-9) in an equivalent thereto, and replacing 2,5-bis(4-diethylaminophenyl)-1,3,4-oxadiazole used in the same with 9(p-diethylamino)anthracene in an equivalent thereto.

When the thus obtained photosensitive materials were subjected to the same measurement as in Example 14, the result was as shown in Table-9, respectively. In this context, the result of the same measurement conducted on the dispersion-type photosensitive material obtained in Example 44 is also listed in Table-9. The showing in this table verifies that the photosensitive materials according to the present invention are superior to those known heretofore in surface potential as well as sensitivity.

Table-9

| | Compound | Dispersion-type photo-material | | Laminate-type photo-material | |
|---|---|---|---|---|---|
| | | Vpo | $E_{\frac{1}{2}}$ | Vpo | $E_{\frac{1}{2}}$ |
| Comparative Example 1 (U.S. Pat. No. 3,898,084) | 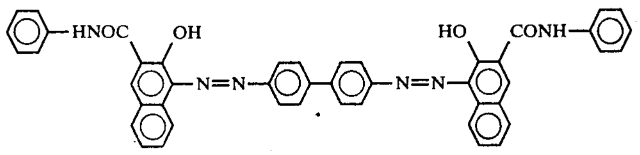 | 920 | 27.7 | — | — |
| Comparative Example 2 (U.S. Pat. No. 3,898,084) | 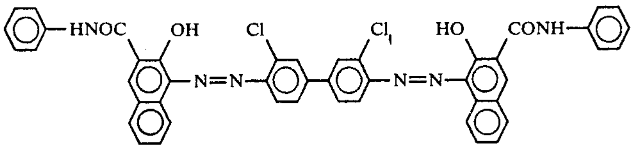 | — | — | 800 | 4.3 |
| Comparative Examples 3 and 4 (U.S. Pat. No. 4,052,210) | 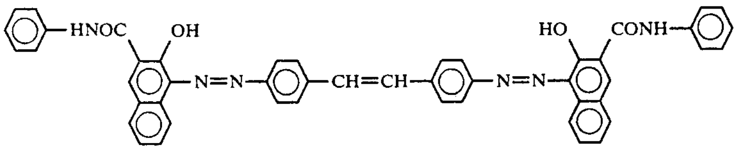 | 435 | 17.1 | 820 | 5.8 |
| Example 44 | 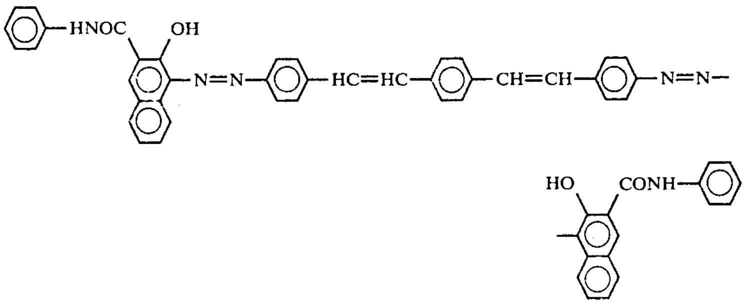 | 1035 | 4.0 | — | — |

(No. 1)

Table-9-continued

| | Compound | Dispersion-type photo-material Vpo | Dispersion-type photo-material E½ | Laminate-type photo-material Vpo | Laminate-type photo-material E½ |
|---|---|---|---|---|---|
| Example 74 | 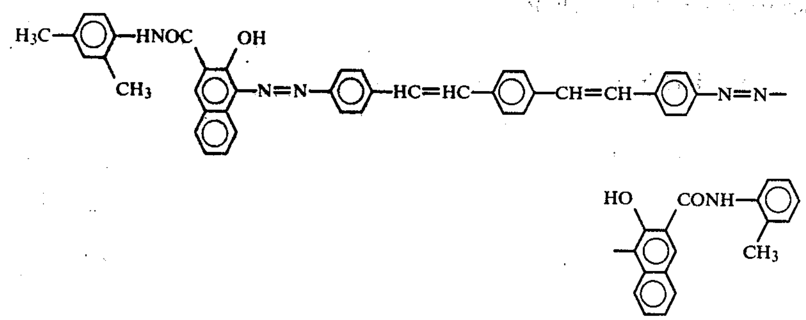 (No. 13) | — | — | 660 | 1.4 |

What is claimed is:

1. A disazo compound having the formula

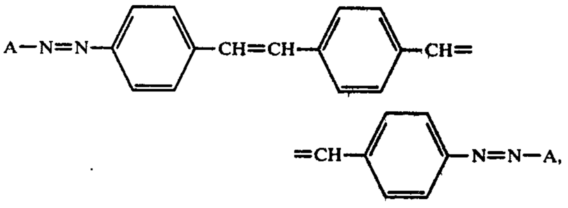

wherein A is

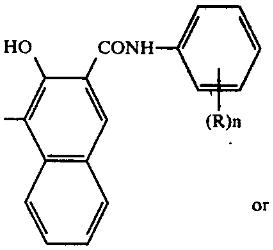

or

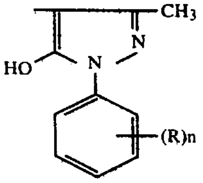

and wherein R is alkyl, alkoxy, nitro, dialkylamino or halogen, n is 0 or an integer of 1, 2 or 3, and R may be either the same or different when n is 2 or 3.

2. A compound as claimed in claim 1 in which A is

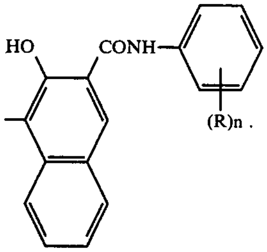

3. A compound as claimed in claim 2 in which "n" is 0.

4. A compound as claimed in claim 2 in which "n" is 1.

5. A compound as claimed in claim 4 in which R is alkoxy.

6. A compound as claimed in claim 4 in which R is p—$OCH_3$.

7. A compound as claimed in claim 4 in which R is o—$OCH_3$.

8. A compound as claimed in claim 4 in which R is alkyl.

9. A compound as claimed in claim 4 in which R is o—$CH_3$.

10. A compound as claimed in claim 4 in which R is halogen.

11. A compound as claimed in claim 4 in which R is p—Cl.

12. A compound as claimed in claim 4 in which R is dialkylamino.

13. A compound as claimed in claim 4 in which R is p—$N(CH_3)_2$.

14. A compound as claimed in claim 4 in which R is nitro.

15. A compound as claimed in claim 4 in which R is m—$NO_2$.

16. A compound as claimed in claim 4 in which R is p—$NO_2$.

17. A compound as claimed in claim 2 in which "n" is 2.

18. A compound as claimed in claim 17 in which R is alkoxy.

19. A compound as claimed in claim 17 in which (R)n is 2,5-dimethoxy.

20. A compound as claimed in claim 17 in which R is alkyl.

21. A compound as claimed in claim 17 in which (R)n is 2,4-dimethyl.

22. A compound as claimed in claim 17 in which (R)n is 2-methyl-4-chloro.

23. A compound as claimed in claim 2 in which "n" is 3.

24. A compound as claimed in claim 23 in which (R)n is 2,5-dimethoxy-4-chloro.

25. A compound as claimed in claim 1 in which A is

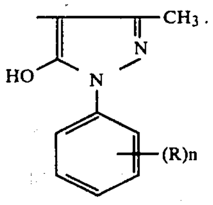

26. A compound as claimed in claim 25 in which "n" is zero.

27. A compound as claimed in claim 25 in which "n" is 1.

28. A compound as claimed in claim 27 in which R is p—$NO_2$.

* * * * *